United States Patent
Xu et al.

(10) Patent No.: US 11,991,771 B2
(45) Date of Patent: May 21, 2024

(54) CONFIGURATIONS FOR LAYER 1 AND LAYER 2-CENTRIC INTER-CELL MOBILITY

(71) Applicant: APPLE INC., Cupertino, CA (US)

(72) Inventors: Fangli Xu, Beijing (CN); Chunhai Yao, Beijing (CN); Dawei Zhang, Cupertino, CA (US); Haijing Hu, Cupertino, CA (US); Qiming Li, Beijing (CN); Wei Zeng, Cupertino, CA (US); Yang Tang, Cupertino, CA (US); Yuqin Chen, Beijing (CN); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 375 days.

(21) Appl. No.: 17/593,253

(22) PCT Filed: Apr. 1, 2021

(86) PCT No.: PCT/CN2021/084955
§ 371 (c)(1),
(2) Date: Sep. 14, 2021

(87) PCT Pub. No.: WO2022/205317
PCT Pub. Date: Oct. 6, 2022

(65) Prior Publication Data
US 2023/0247708 A1    Aug. 3, 2023

(51) Int. Cl.
*H04W 76/20* (2018.01)
*H04W 74/0833* (2024.01)
*H04W 76/15* (2018.01)

(52) U.S. Cl.
CPC ....... *H04W 76/20* (2018.02); *H04W 74/0833* (2013.01); *H04W 76/15* (2018.02)

(58) Field of Classification Search
CPC . H04W 76/20; H04W 74/0833; H04W 76/15; H04W 36/0055; H04W 4/38;
(Continued)

(56) References Cited

U.S. PATENT DOCUMENTS

| 2015/0172988 A1* | 6/2015 | Lai .................. H04W 36/00837 455/436 |
| 2020/0045745 A1 | 2/2020 | Cirik et al. |

(Continued)

FOREIGN PATENT DOCUMENTS

| CN | 104770005 A | 7/2015 |
| CN | 111901844 A | 11/2020 |
| CN | 112136339 A | 12/2020 |

OTHER PUBLICATIONS

PCT/CN2021/084955, International Search Report and Written Opinion, Jan. 7, 2022, 9 pages.

*Primary Examiner* — Kibrom T Hailu
(74) *Attorney, Agent, or Firm* — Dorsey & Whitney LLP

(57) ABSTRACT

Inter-cell mobility may include decoding a first radio resource control (RRC) reconfiguration message received from a first cell. The first RRC reconfiguration message may comprise a first portion of configuration information for performing a cell change to a second cell. A cell change message received from the first cell may be decoded. The cell change message may indicate that a cell change to the second cell is to be performed. A cell change acknowledgment may be encoded for transmission to the second cell. A second RRC reconfiguration message received from the second cell may be decoded. The second RRC reconfiguration message may comprise a second portion of configuration information for performing the cell change to the second cell. The second portion of configuration information may comprise a remaining portion of configuration information to perform the cell change to the second cell.

20 Claims, 15 Drawing Sheets

(58) Field of Classification Search
CPC ....... H04W 4/80; H04W 24/02; H04W 24/10; H04W 36/08; H04W 76/19; H04W 76/27; H04W 76/28; H04L 69/324; H04L 69/323
See application file for complete search history.

(56) References Cited

U.S. PATENT DOCUMENTS

| | | | |
|---|---|---|---|
| 2020/0305218 A1* | 9/2020 | Zhu | H04L 1/1671 |
| 2022/0030483 A1* | 1/2022 | Cheng | H04W 36/0058 |
| 2022/0191968 A1* | 6/2022 | Tsuboi | H04W 76/38 |
| 2022/0287102 A1* | 9/2022 | Futaki | H04W 48/12 |
| 2022/0330101 A1* | 10/2022 | Futaki | H04B 7/024 |
| 2022/0361071 A1* | 11/2022 | Awada | H04W 36/0055 |
| 2023/0108496 A1* | 4/2023 | Ohlsson | H04W 36/18 370/329 |
| 2023/0232300 A1* | 7/2023 | Awada | H04W 36/24 370/331 |

* cited by examiner

CONFIGURATIONS FOR LAYER 1 AND LAYER 2-CENTRIC INTER-CELL MOBILITY

TECHNICAL FIELD

This application relates generally to wireless communication systems, including inter-cell mobility.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) includes sub-6 GHz frequency bands, some of which are bands that may be used by previous standards, but may potentially be extended to cover potential new spectrum offerings from 410 MHz to 7125 MHz. Frequency Range 2 (FR2) includes frequency bands from 24.25 GHz to 52.6 GHz. Bands in the millimeter wave (mmWave) range of FR2 have shorter range but higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

By way of background, legacy handover (HO) schemes can be used for inter-cell mobility for connected user equipments (UEs), as well as intra-cell key updates for connected UEs. Legacy HO schemes have also include two HO types, including: 1. Radio link control (RLC)/medium access control (MAC) reset with packet data convergence protocol (PDCP) re-establishment; and 2. RLC/MAC reset without PDCP re-establishment. Notably, components for HO interruption time include: C1: Radio frequency (RF) retuning; C2: Downlink (DL) sync in target cell; C3: Layer 2 (L2) reset; and C4: Uplink (UL) sync in target cell.

Figure 1:
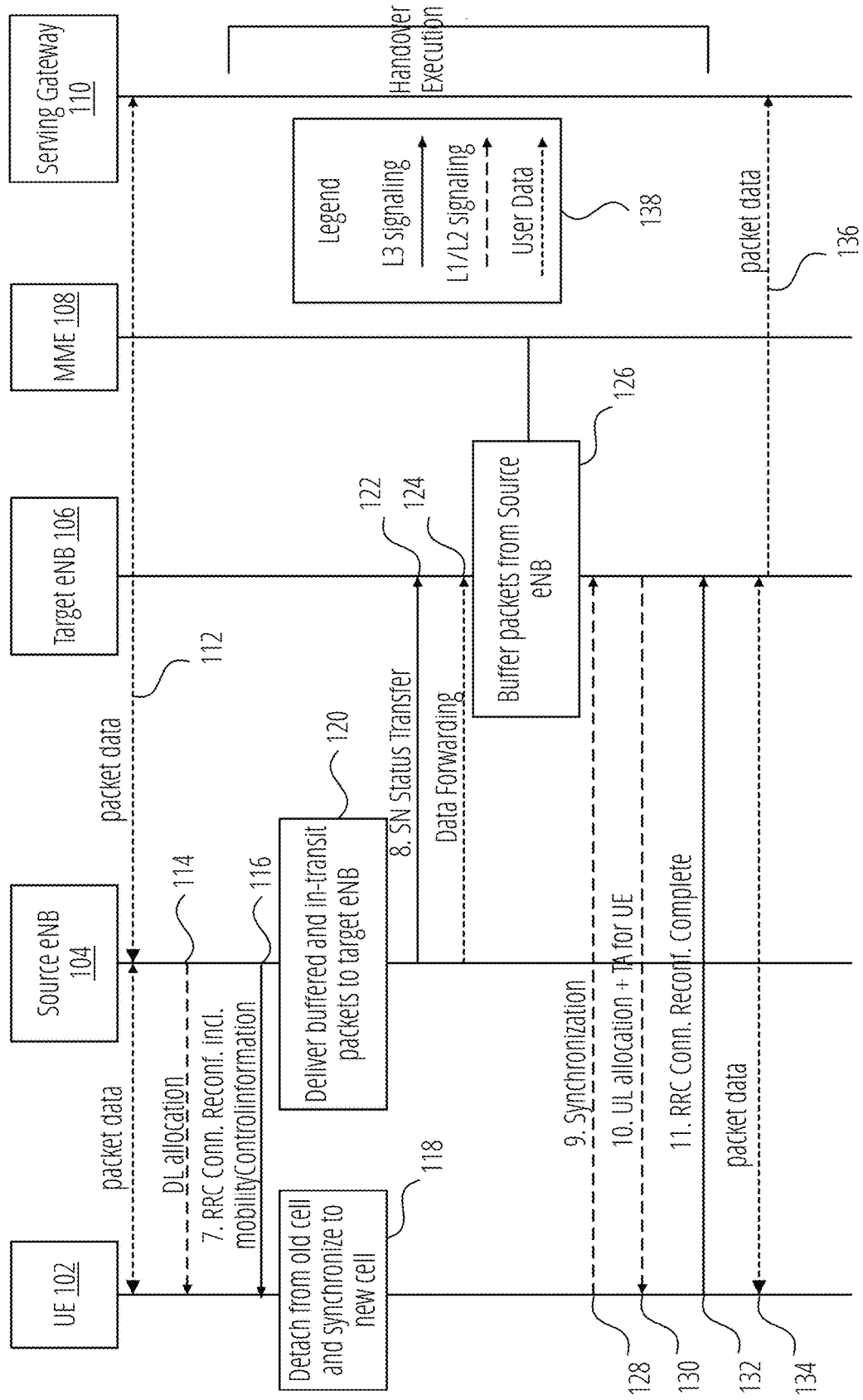
FIG. 1 illustrates an example legacy handover data flowchart in accordance with one embodiment.

FIG. 1 illustrates an example legacy handover data flowchart. FIG. 1 includes a UE 102, a Source eNB 104, a Target eNB 106, a mobility management entity (MME) 108, and a Serving Gateway 110. As shown, packet data is transmitted between the Serving Gateway 110, the Source eNB 104, and the UE 102, as represented by arrow 112. Following such transmissions, a downlink (DL) allocation message is sent from the Source eNB 104 to the UE 102, as represented by arrow 114. The Source eNB 104 then sends a radio resource control (RRC) connection reconfiguration message that includes mobilityControlInformation to the UE 102, as represented by arrow 116. The UE 102 may then detach from the old cell (i.e., Source eNB 104) and synchronize to the new cell (i.e., Target eNB 106), as represented by block 118. In addition, the Source eNB 104 may deliver buffered and in-transit packets to the Target eNB 106 including sequence number (SN) status transfer and data forwarding, as represented by block 120, arrow 122, and arrow 124, respectively.

The Target eNB 106 in conjunction with the MME 108 may then buffer packets from the Source eNB 104, as represented by block 126. A synchronization message may then be sent from the UE 102 to the Target eNB 106, as represented by arrow 128. The Target eNB 106 may then send an uplink (UL) allocation and timing advance message to the UE 102, as represented by arrow 130. The UE 102 may then send an RRC connection reconfiguration complete message to the Target eNB 106. Packet data can then be transmitted between the Serving Gateway 110, the Target eNB 106, and the UE 102, as represented by arrow 134 and arrow 136.

Notably, as shown by Legend 138, the straight line arrows each represent Layer 3 (L3) signaling (i.e., arrow 116, arrow 122, and arrow 132), the larger dotted-line arrows represent Layer 1 (L1) and Layer 2 (L2) signaling (i.e., arrow 114, arrow 128, and arrow 130), and the smaller dotted-line arrows represent user data (i.e., arrow 112, arrow 124, arrow 134, and arrow 136). In addition, handover execution occurs beginning at arrow 116 (i.e., the RRC connection reconfiguration message from the Source eNB 104 to the UE 102) and ending at arrow 132 (i.e., the RRC connection reconfiguration complete message from the UE 102 to the Target eNB 106).

Figure 2A:
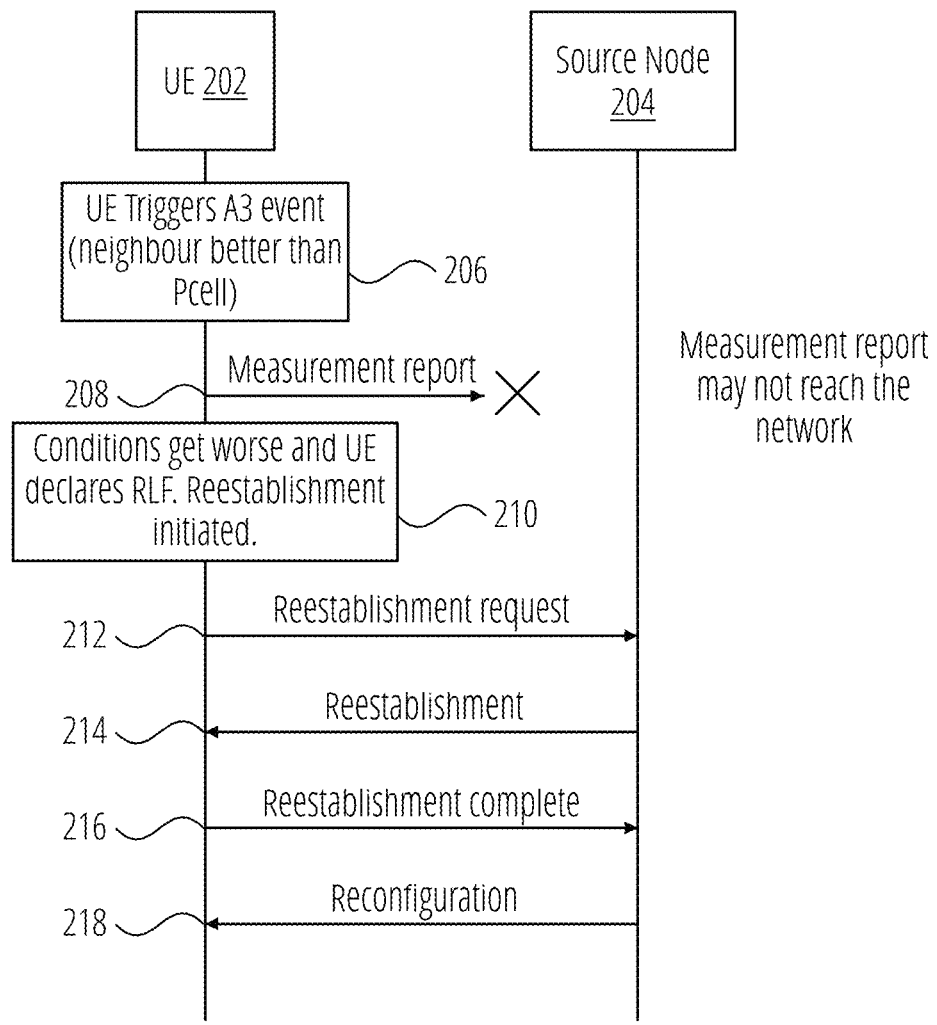
FIG. 2A illustrates an example legacy handover data flowchart in accordance with one embodiment.
Figure 2B:
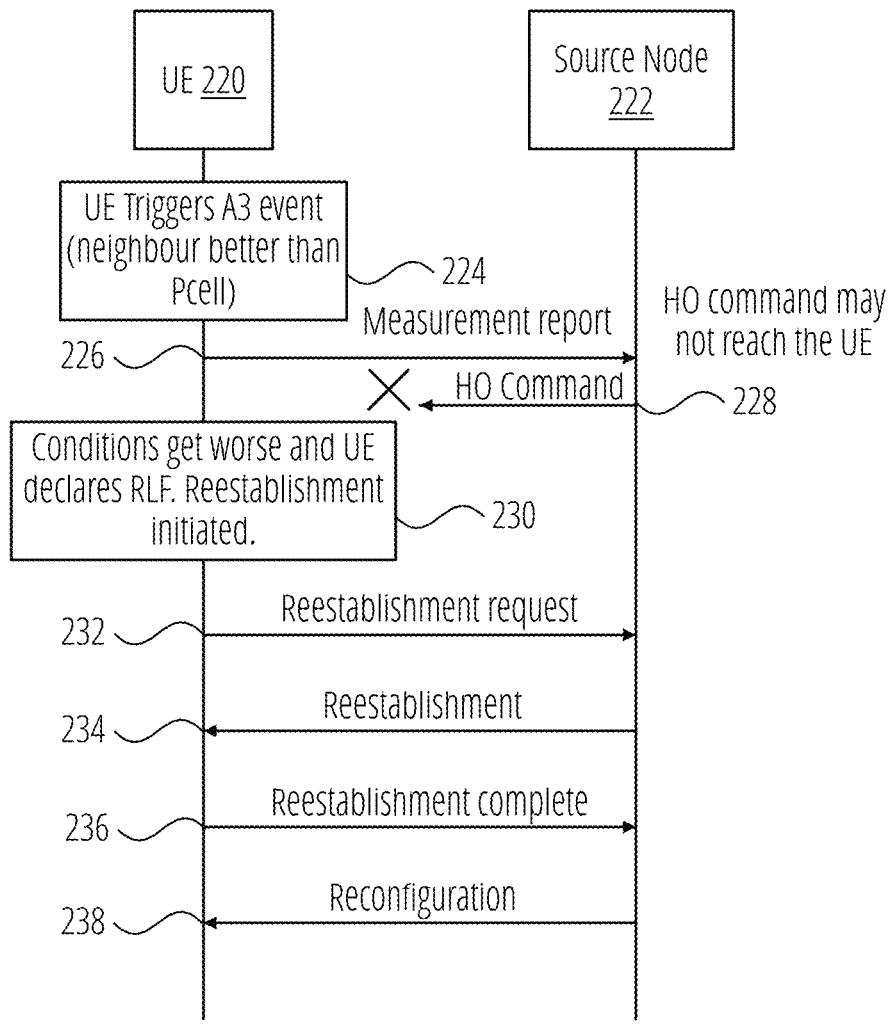
FIG. 2B illustrates an example legacy handover data flowchart in accordance with one embodiment.

As shown in FIG. 2A and FIG. 2B, legacy HO has various issues. FIG. 2A illustrates a portion of a legacy handover data flowchart with a first possible issue. In particular, FIG. 2A includes communications between a UE 202 and a Source Node 204. Initially, as represented by block 206, the UE 202 may trigger an A3 event because a neighbor cell appears to be better than a current primary cell (i.e., the Source Node 204). The UE 202 may then attempt to transmit a measurement report, as represented by arrow 208. However, the measurement report may not reach the network, which can interrupt the handover process. This can result in conditions worsening and the UE 202 declaring radio link failure (RLF) and initiating reestablishment. The UE 202 and the Source Node 204 may then transmit various reestablishment and reconfiguration messages, as represented by arrow 212, arrow 214, arrow 216, and arrow 218.

FIG. 2B illustrates a portion of a legacy handover data flowchart with a second possible issue. In particular, FIG. 2B includes communications between a UE 220 and a Source Node 222. Initially, as represented by block 224, the UE 220 may trigger an A3 event because a neighbor cell appears to be better than a current primary cell (i.e., the Source Node 222). The UE 220 may then transmit a measurement report, as represented by arrow 226. In response, the Source Node 222 may attempt to send a handover command, as represented by arrow 228. However, the handover command may not reach the UE 220, which can interrupt the handover process. This can result in conditions worsening and the UE 220 declaring radio link failure (RLF) and initiating reestablishment. The UE 220 and the Source Node 222 may then transmit various reestablishment and reconfiguration messages, as represented by arrow 232, arrow 234, arrow 236, and arrow 238.

Some of these issues may be resolved by 3GPP Release 16 (Rel-16) conditional HO (CHO). CHO includes the following characteristics: 1. The network (NW) may provide a CHO command in advance to a UE; 2. The CHO command may include the configuration of multiple CHO candidate cells and corresponding HO condition(s); 3. The HO condition(s) may reuse a measurement event A3/A5, which condition(s) is decided by the source cell; 4. The UE may execute the HO to the target cell when the condition(s) is met; and 5. The UE may release the configuration of all CHO candidates after a successful handover completion.

Figure 3:
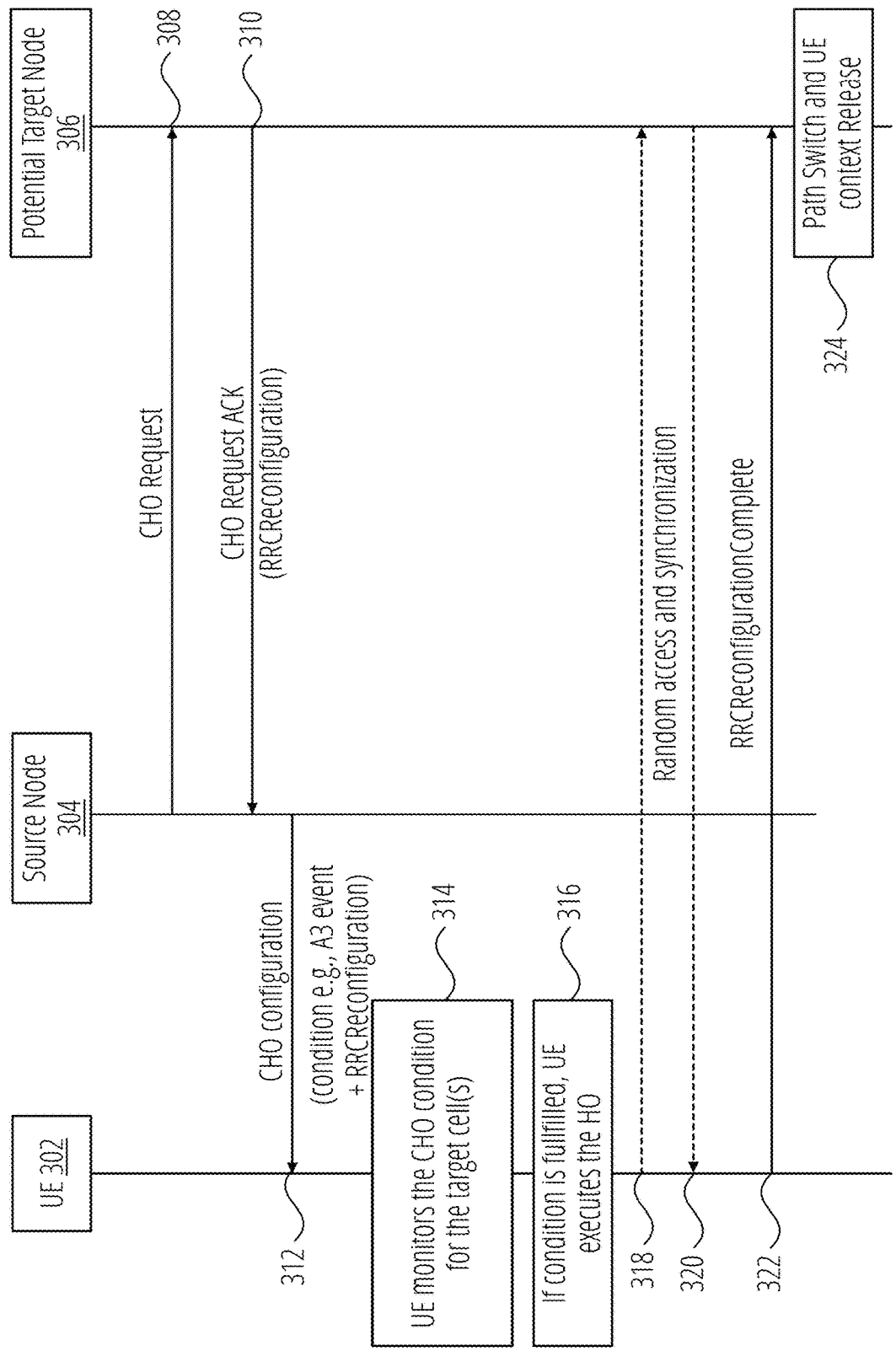
FIG. 3 illustrates a CHO data flowchart in accordance with one embodiment.

FIG. 3 illustrates a CHO data flowchart showing these characteristics. In particular, FIG. 3 includes a UE 302, a Source Node 304, and a Potential Target Node 306. Initially, the Source Node 304 may send a CHO request to the Potential Target Node 306, as represented by arrow 308, and the Potential Target Node 306 may respond with a CHO request acknowledgement (e.g., an RRC reconfiguration message), as represented by arrow 310. The Source Node 304 may then send a CHO configuration message to the UE 302, as represented by arrow 312. For instance, the Source Node 304 may send the CHO configuration message (e.g., an RRC reconfiguration message) in response to a condition being met (e.g., an A3 event).

The UE 302 may then monitor the CHO condition for target cells, as represented by block 314. If the CHO condition is fulfilled, the UE 302 may then execute the handover. In such situations, random access and synchronization procedures may occur between the UE 302 and the Potential Target Node 306, as represented by arrow 318 and arrow 320. The UE 302 may then send an RRC reconfiguration complete message to the Potential Target Node 306, as represented by the arrow 322. Finally, a path switch and UE context release may occur, as represented by block 324.

Despite the improvements with Rel-16 CHO, further enhancements are to be created in 3GPP Release 17 (Rel-17), as further discussed with respect to Work Item Description (WID): Further enhancements on MIMO for NR (RP-202024), which discusses a desire for enhancements to Layer 1 (L1)/L2-centric inter-cell mobility, as well as enhancements on signaling mechanisms to improve latency and efficiency with more usage of dynamic control signaling (as opposed to radio resource control (RRC)). One such scenario for L1/L2 centric inter-cell mobility comprises a fast cell change with high frequency.

However, if a NW configures multiple candidate cells for a UE in advance, the NW generally has to reserve the UE dedicate resource(s) for a relatively long period of time, and may have to change such resources before the UE even accesses a cell corresponding to those resources (which introduces unnecessary signaling overhead). Current legacy Layer 3 (L3) handover mechanisms may not achieve the desires discussed above, as it includes: 1. Long handover latency: a. Between HO command reception to HO complete message transmission (in legacy mechanism); and b. Between CHO execution to CHO handover complete message transmission in CHO; 2. Long interruption time during HO, including: a. Applying the target cell configuration; b. DL timing acquisition in the target cell; and c. Random access channel (RACH) latency in the target cell; and 3. Heavy signaling overhead, including: a. RRC messaging (HO command, HO complete) for each cell change; and b. RACH (i.e., Msg1, Msg2, Msg3, and Msg4) for UL sync in the target cell. In contrast, the principles described herein include a 2-step configuration for L1/L2 centric inter-cell mobility to achieve desired enhancements associated with handovers.

Figure 4:
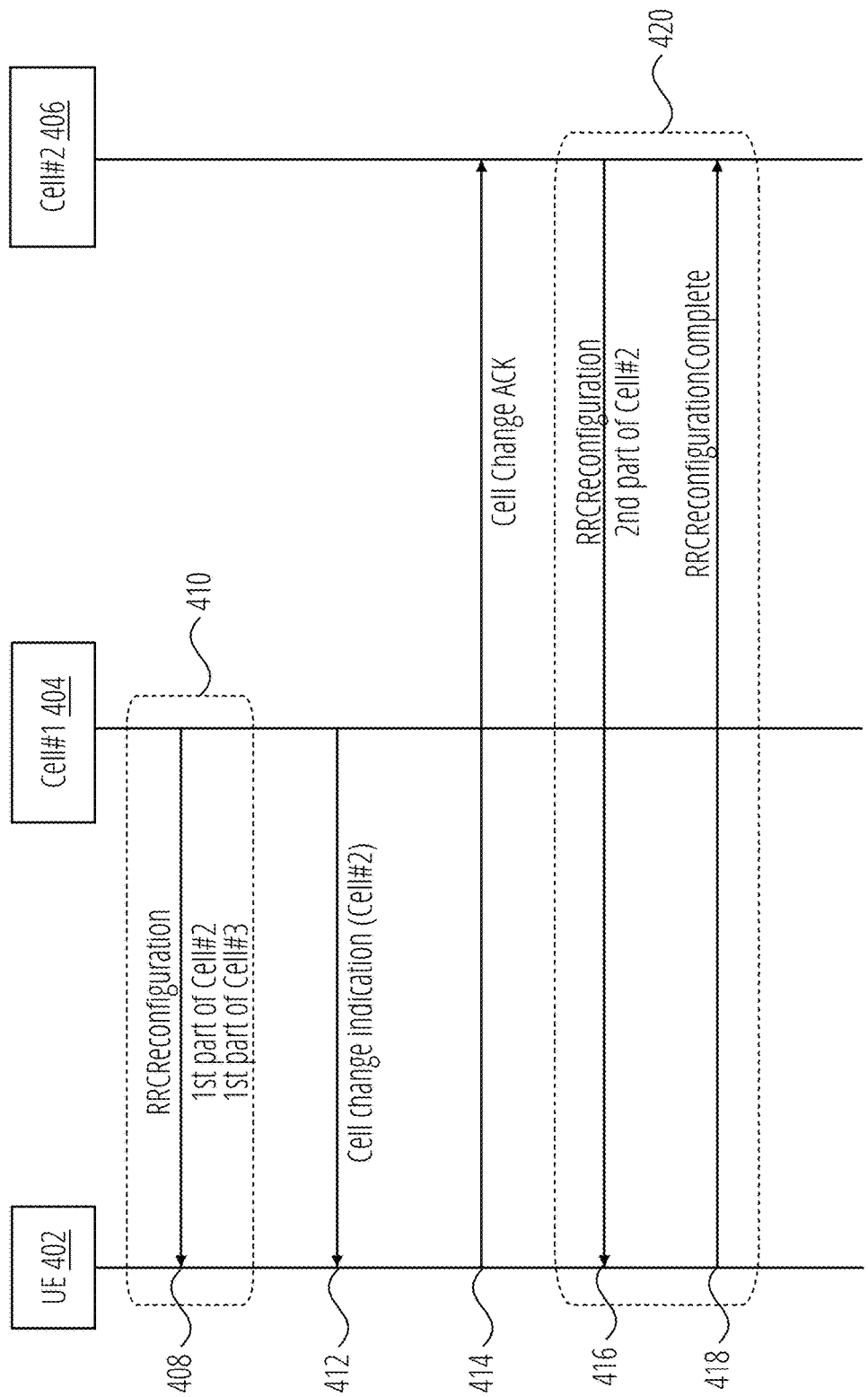
FIG. 4 illustrates a data flowchart of an RRC configuration of the target cell that is split in two portions in accordance with one embodiment.

FIG. 4 illustrates a data flowchart of an RRC configuration of the target cell that is split in two portions. As shown, FIG. 4 includes a UE 402, a Cell#1 404 (i.e., a source/serving cell), and a Cell#2 406 (e.g., a target cell). Initially, the first portion of configuration information (via an RRC reconfiguration message) is sent by the Cell#1 404 to the UE 402, as represented by block 410 and arrow 408. The first portion may include at least configuration information related to initial access of the target cell, as well as a default/common configuration of the target cell (e.g., an initial bandwidth part (BWP), system information block 1 (SIB1), master information block (MIB), and so forth). In addition, the Cell#1 404 may transmit a cell change indication associated with the target cell, Cell#2 406, as represented by arrow 412.

Notably, the NW (e.g., the Cell#1 404) may provide the first portion of the RRC configuration associated with the target cell(s) in advance. The UE may then apply the first portion of the RRC configuration when the UE performs DL timing and UL sync with respect to the target cell. As illustrated, the UE 402 may also perform an initial access or initial transmission/reception associated with the target cell before the UE acquires the second portion of the RRC configuration corresponding to the target cell, as illustrated by arrow 414.

As shown, the target cell, Cell#2 406 may then send the second portion of the RRC reconfiguration configuration information, as represented by block 420 and arrow 416. The second portion may include the remaining configuration information associated with the target cell. As an example, such information may include UE-dedicated configuration information, measurement configuration information, carrier aggregation (CA)/dual connectivity (DC) information, and so forth.

When the NW provides the second portion of the RRC configuration, it may include: 1. A delta configuration (i.e., generally limited to the parts of the configuration not provided as part of the first portion of the RRC configuration); 2. The full RRC configuration despite receiving part of the RRC configuration as the first portion of the RRC configuration; and/or 3. A first portion of an RRC configuration corresponding to new potential target cells (i.e., now that the original target cell has become the serving/source cell). In addition, when receiving the first portion of an RRC configuration corresponding to new potential target cells (e.g., a cell#3) as part of the second portion of the RRC configuration, the UE may store such configuration information for future cell change usage. The UE may then send an RRC reconfiguration complete message using the second portion of configuration information to complete the cell change to the Cell#2 406, as represented by arrow 418.

Notably, the UE may perform various actions as follows: 1. The UE may apply the first portion of an RRC configuration associated with a target cell when the UE begins executing a cell change to the target cell; 2. The UE may release the first portion of an RRC configuration associated with a target cell when the NW indicates to release the first portion or after the UE changes to the corresponding target cell successfully; 3. The UE may apply the second portion of an RRC configuration associated with a target cell immediately upon receiving the second portion; and 4. The UE may release the second portion of an RRC configuration associated with a cell when leaving that cell (i.e., the current serving cell).

The UE's first UL transmission to the target cell may comprise a: 1. A RACH procedure using a RACH configuration provided in first portion of RRC configuration corresponding to target cell. In addition, the UE can acquire a C-RNTI via the RACH procedure in such embodiments; or 2. A schedule request (SR)/physical uplink control channel (PUCCH)/physical uplink shared channel (PUSCH) transmission. The SR/PUCCH/PUSCH configuration information may be provided in the first portion of an RRC configuration corresponding to a target cell. Furthermore, the NW may provide a C-RNTI in the previous serving cell or in the first portion of an RRC configuration corresponding to the target cell when the UE's first UL transmission comprises an SR/PUCCH/PUS CH.

Furthermore, the NW (e.g., via the target cell) may provide the second portion of the RRC configuration corresponding to the target cell as soon as possible. For instance, the second portion may be provided in the first DL transmission, or may be delivered within a configured period (e.g., a period of time configured by the NW). PDCCH monitoring information associated with at least the first DL transmission may be included in the first portion of an RRC configuration corresponding to a target cell.

The UE may apply the second portion of an RRC configuration corresponding to a target cell immediately upon receiving it. In addition, the UE may utilize the second portion for performing data transmission, data reception, and measurement. The UE may also store any received first portions of an RRC configuration corresponding to other target cells (i.e., target cells other than the current serving cell (or source cell) and the target cell that is in the process of becoming the serving cell). Before a UE receives the second portion of an RRC configuration corresponding to a target cell, the UE may communicate with the target cell with an initial BWP (note that an alternative to using an initial BWP may be using a first active BWP of the serving cell) configured based on the first portion of an RRC configuration corresponding to a target cell.

Figure 5:
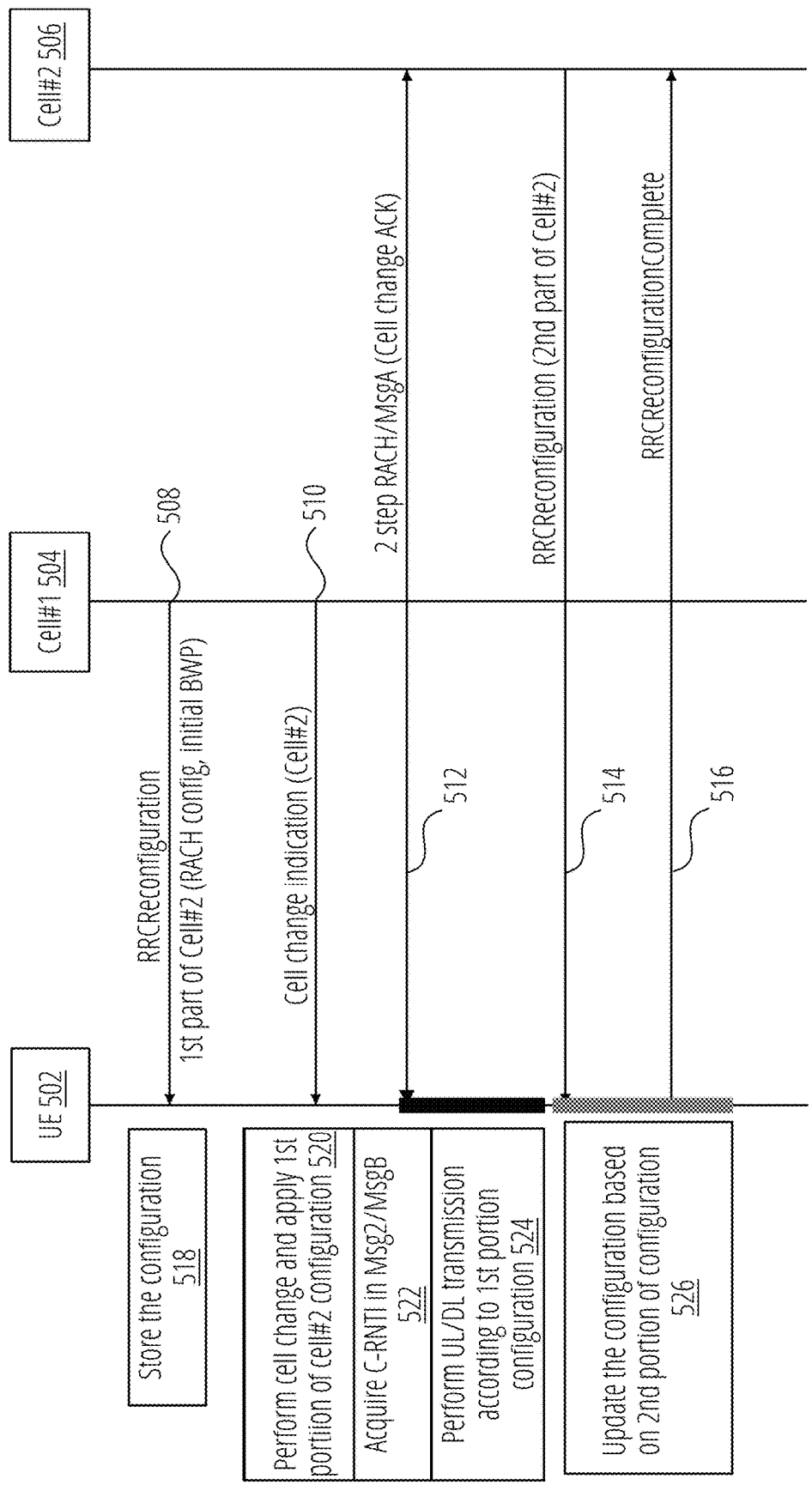
FIG. 5 illustrates a data flowchart of an RRC configuration of the target cell that is split in two portions in accordance with one embodiment.

FIG. 5 illustrates the use of a RACH procedure within the two-step cell change discussed herein. As shown, FIG. 5 includes a UE 502, a Cell#1 504, and a Cell#2 506. Once again, initially, the Cell#1 504 may send the first portion of configuration information (i.e., via an RRC reconfiguration message) to the UE 502, as represented by arrow 508. The first portion may include RACH configuration information and/or an initial BWP. The UE 502 may store the first portion of configuration information until it can be used, as represented by block 518.

At some point (e.g., in response to a particular condition), the Cell#1 504 may transmit a cell change indication associated with the target cell, Cell#2 506, as represented by arrow 510. As described elsewhere herein, the UE 502 may apply the first portion of configuration information associated with the target cell, Cell#2 506 (as represented by block 520). Using the RACH configuration information acquired in the first portion of configuration information, the UE 502 and the Cell#2 506 may perform a two-step RACH procedure. As part of the RACH procedure, the UE may acquire a cell radio network temporary identifier (C-RNTI) corresponding to the target cell and the UE and target cell may perform initial UL/DL transmissions based on the first portion of configuration information (as represented by block 520 and block 522, respectively).

As shown, the target cell, Cell#2 506 may then send the second portion of the RRC reconfiguration configuration information, as represented by arrow 514. The second portion may include the remaining configuration information associated with the target cell, as represented by block 526. As an example, such information may include UE-dedicated configuration information, measurement configuration information, carrier aggregation (CA)/dual connectivity (DC) information, and so forth. The UE 502 may then transmit an RRC reconfiguration complete message to the Cell#2 506 to complete the cell change, as represented by arrow 516.

Figure 6:
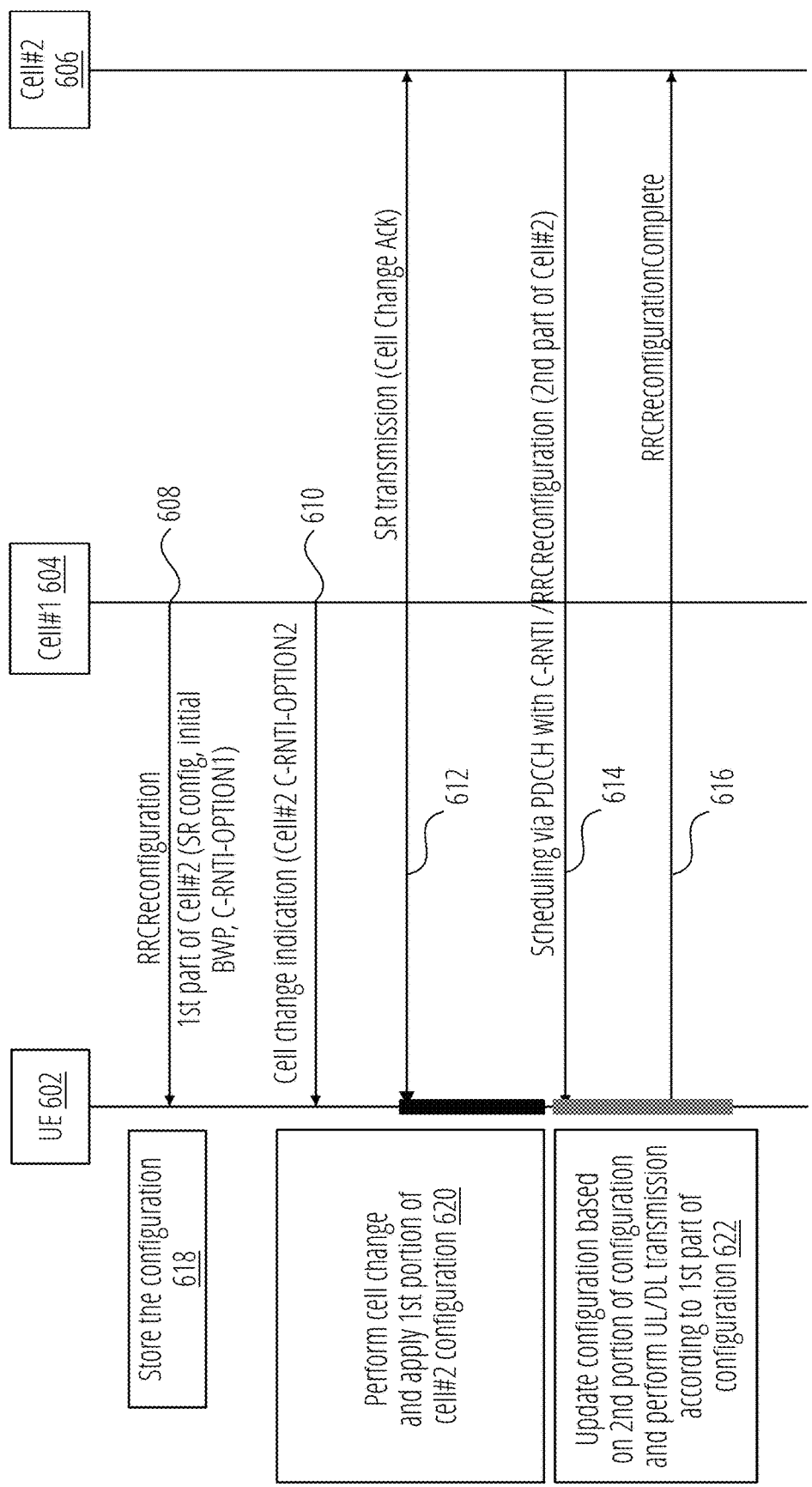
FIG. 6 illustrates a data flowchart of an RRC configuration of the target cell that is split in two portions in accordance with one embodiment.

FIG. 6 illustrates the use of an SR within the two-step cell change discussed herein. As shown, FIG. 6 includes a UE 602, a Cell#1 604, and a Cell#2 606. Once again, initially, the Cell#1 604 may send the first portion of configuration information (i.e., via an RRC reconfiguration message) to the UE 602, as represented by arrow 608. The first portion may include SR configuration information, an initial BWP, and/or a C-RNTI-OPTION1. The UE 602 may store the first portion of configuration information until it can be used, as represented by block 618.

At some point (e.g., in response to a particular condition), the Cell#1 604 may transmit a cell change indication associated with the target cell, Cell#2 606, as represented by arrow 610. The cell change indication may include a Cell#2 C-RNTI-OPTION2. As described elsewhere herein, the UE 602 may apply the first portion of configuration information associated with the target cell, Cell#2 606 (as represented by block 620).

Using the SR configuration information acquired in the first portion of configuration information, the UE 602 and the Cell#2 606 may perform an SR transmission procedure. As shown, the target cell, Cell#2 606, may then send the second portion of the RRC reconfiguration configuration information, as represented by arrow 614. The second portion may include the remaining configuration information associated with the target cell and the UL/DL transmissions may initially be performed according to the first portion of configuration information, as represented by block 622. As an example, such information may include UE-dedicated configuration information, measurement configuration information, carrier aggregation (CA)/dual connectivity (DC) information, and so forth. The UE 602 may then transmit an RRC reconfiguration complete message to the Cell#2 606 to complete the cell change, as represented by arrow 616.

Figure 7:
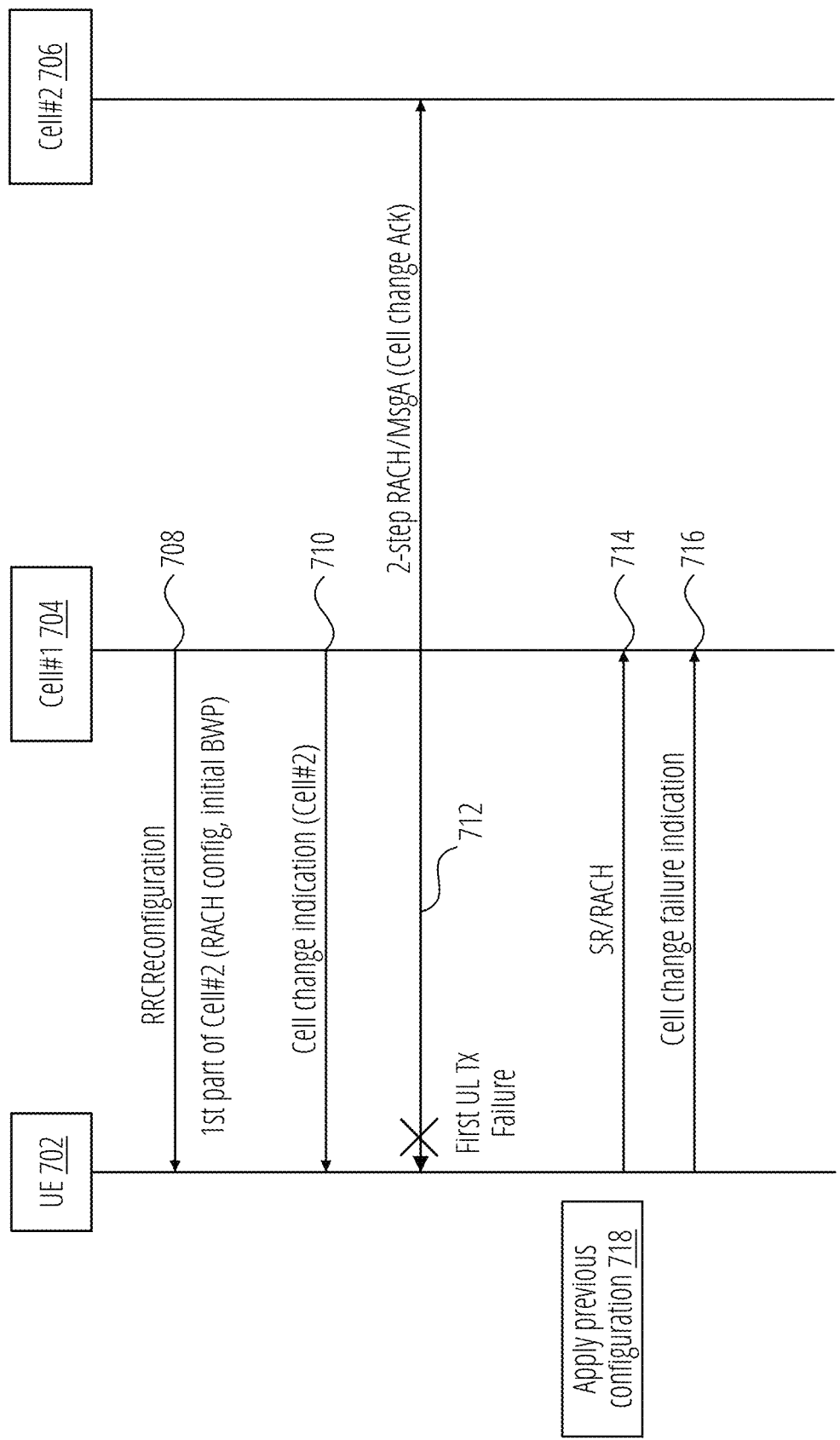
FIG. 7 illustrates a data flowchart of an RRC configuration of the target cell that is split in two portions in accordance with one embodiment.
Figure 8:
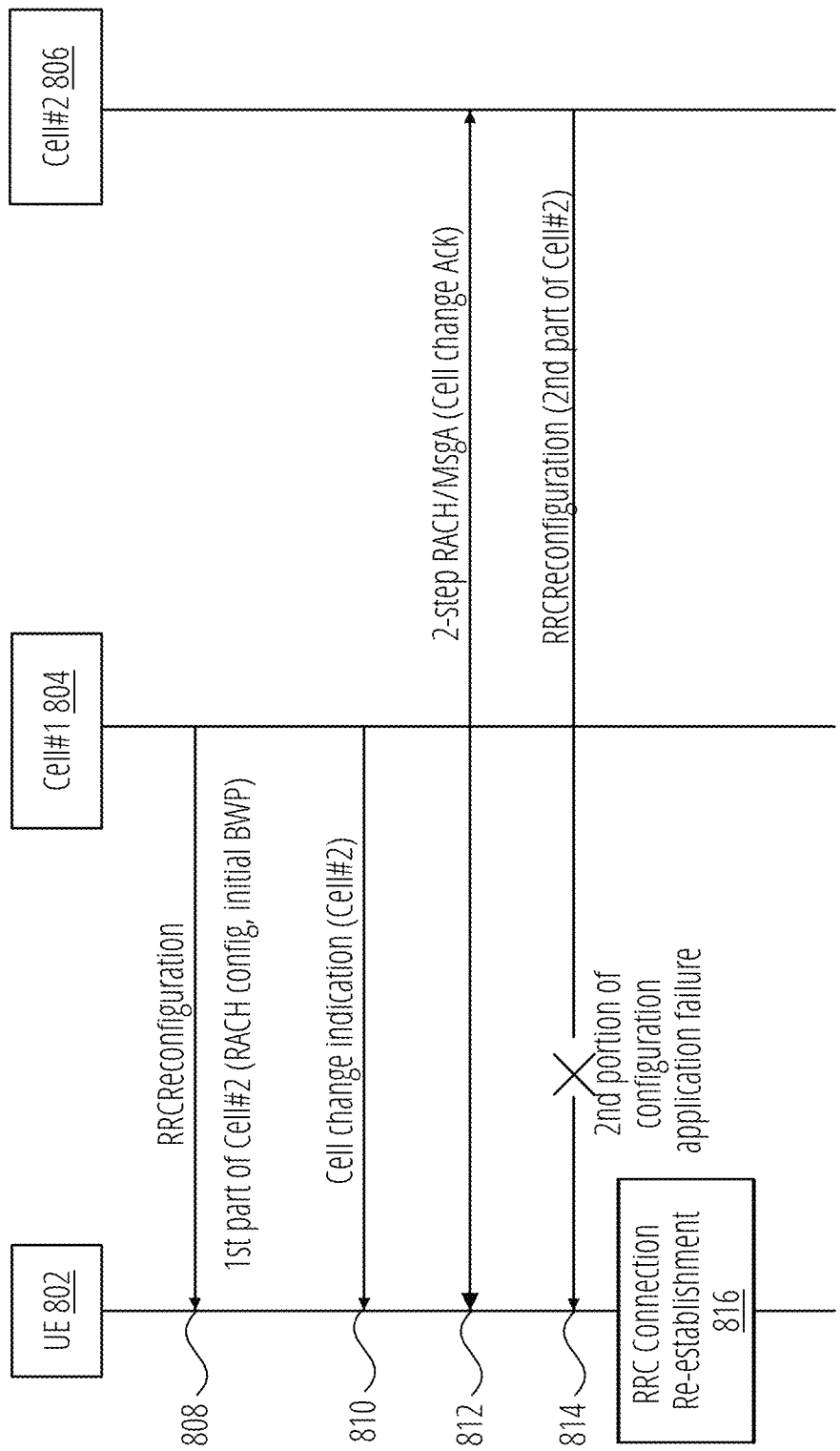
FIG. 8 illustrates a data flowchart of an RRC configuration of the target cell that is split in two portions in accordance with one embodiment.
Figure 9:
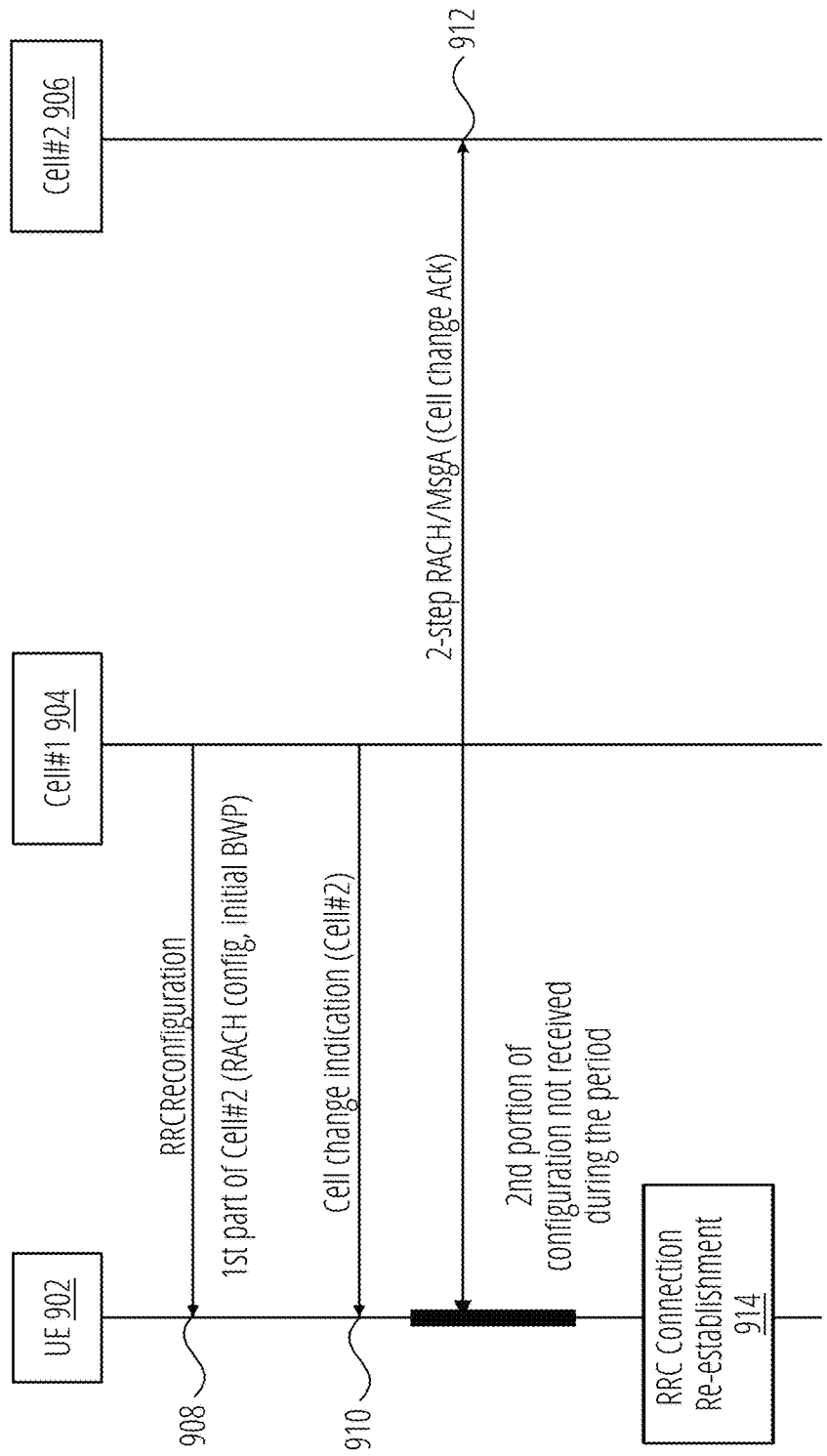
FIG. 9 illustrates a data flowchart of an RRC configuration of the target cell that is split in two portions in accordance with one embodiment.

FIG. 7, FIG. 8, and FIG. 9 each illustrate a particular possible failure case. FIG. 7 illustrates a cell change data flowchart with a first UL transmission failure. As shown, FIG. 7 includes a UE 702, a Cell#1 704, and a Cell#2 706. Once again, initially, the Cell#1 704 may send the first portion of configuration information (i.e., via an RRC reconfiguration message) to the UE 702, as represented by arrow 708. The first portion may include RACH configuration information and/or an initial BWP.

At some point (e.g., in response to a particular condition), the Cell#1 704 may transmit a cell change indication associated with the target cell, Cell#2 706, as represented by arrow 710. Using the RACH configuration information acquired in the first portion of configuration information, the UE 702 and the Cell#2 706 may attempt perform a two-step RACH procedure, as represented by arrow 712. However, the initial UL by the UE 702 during the RACH procedure may fail.

In such a case, the UE 702 may apply the previous configuration, as represented by block 718. The UE 702 may then perform an SR or RACH procedure and transmit a cell change failure indication, as represented by arrow 714 and arrow 716, respectively.

FIG. 8 illustrates a cell change data flowchart with an application failure of the second portion of configuration information. As shown, FIG. 8 includes a UE 802, a Cell#1 804, and a Cell#2 806. Once again, initially, the Cell#1 804 may send the first portion of configuration information (i.e., via an RRC reconfiguration message) to the UE 802, as represented by arrow 808. The first portion may include RACH configuration information and/or an initial BWP.

At some point (e.g., in response to a particular condition), the Cell#1 804 may transmit a cell change indication associated with the target cell, Cell#2 806, as represented by arrow 810. Using the RACH configuration information acquired in the first portion of configuration information, the UE 802 and the Cell#2 806 may perform a two-step RACH procedure, as represented by arrow 812.

As shown, the target cell, Cell#2 806, may then send the second portion of the RRC reconfiguration configuration information, as represented by arrow 814. However, the UE 802 may fail to apply the second portion of configuration information (e.g., incorrect configuration information provided). In response, the UE 802 may attempt to perform an RRC connection re-establishment, as represented by block 816.

FIG. 9 illustrates a cell change data flowchart with a failure to receive the second portion of configuration information. As shown, FIG. 9 includes a UE 902, a Cell#1 904, and a Cell#2 906. Once again, initially, the Cell#1 904 may send the first portion of configuration information (i.e., via an RRC reconfiguration message) to the UE 902, as represented by arrow 908. The first portion may include RACH configuration information and/or an initial BWP.

At some point (e.g., in response to a particular condition), the Cell#1 904 may transmit a cell change indication associated with the target cell, Cell#2 906, as represented by arrow 910. Using the RACH configuration information acquired in the first portion of configuration information, the UE 902 and the Cell#2 906 may perform a two-step RACH procedure, as represented by arrow 912.

As shown, the second portion of the RRC reconfiguration configuration information is not received during a pre-determined time period (e.g., a time period pre-determined by the UE or the NW). In response, the UE 902 may attempt to perform an RRC connection re-establishment, as represented by block 914.

Notably, a UE may determine that a cell change failure has occurred when the following conditions are detected: 1. UE performs a first UL transmission that results in failure N times or within a time window (e.g., a number of times or a time window predetermined by the UE or the serving cell/NW); 2. The UE does not receive the second portion of an RRC configuration corresponding to a target cell within a predetermined period (e.g., predetermined by the serving cell) in a first DL transmission from the target cell; or 3. The UE receives the second portion of an RRC configuration corresponding to a target cell but the second portion results in failure (e.g., application of the second portion by the UE results in failure, the second portion is incorrect, and so forth).

In response to detecting one or more of the above conditions/issues, The UE may perform one or more of the following actions: 1. cell change to the source cell; 2. access to another target cell; or 3. UE connection reestablishment.

Figure 10:
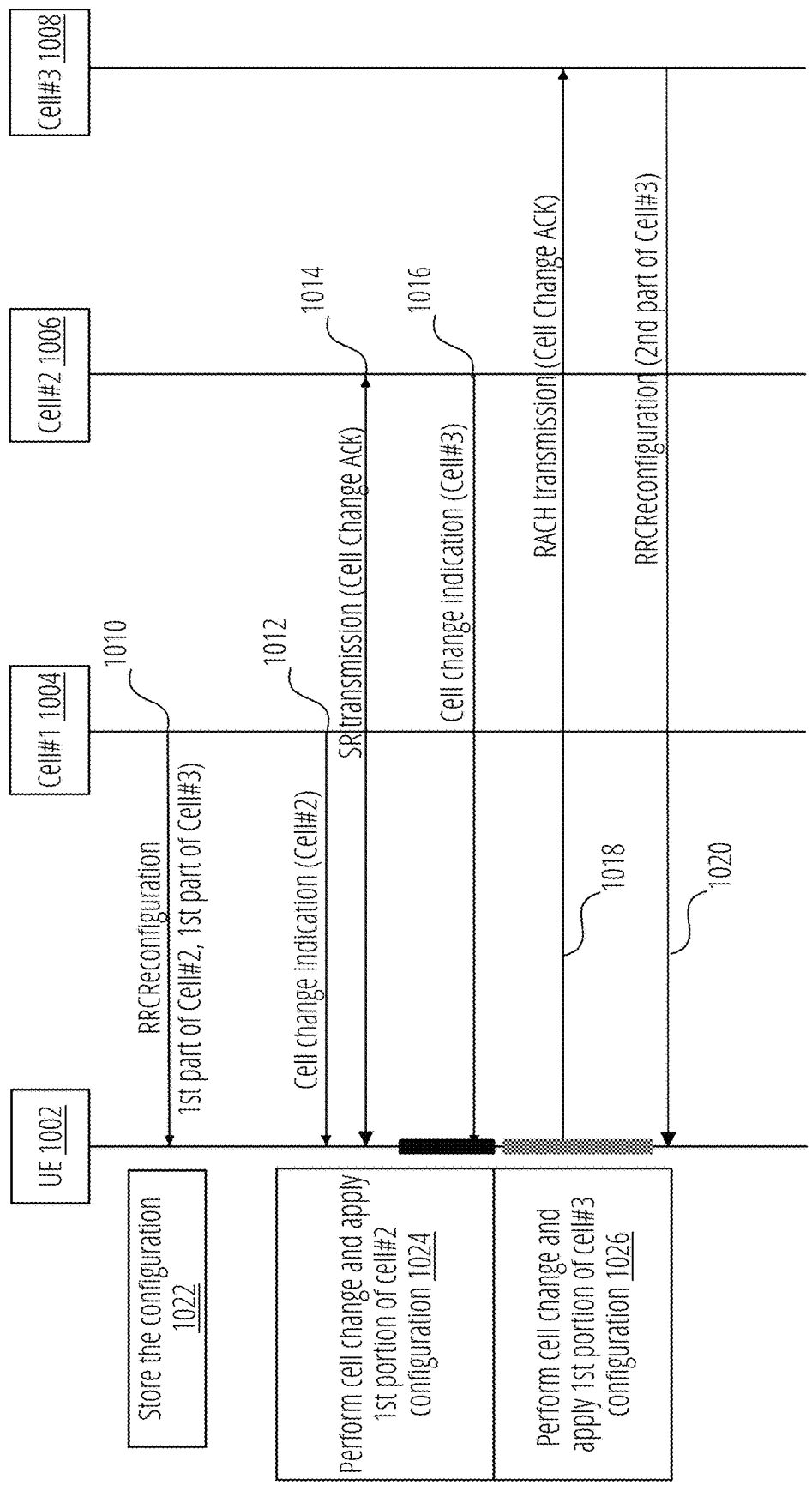
FIG. 10 illustrates a data flowchart of an RRC configuration of the target cell that is split in two portions in accordance with one embodiment.

FIG. 10 illustrates a cell change data flowchart with a failure to receive the second portion of configuration information, as well as additional steps to be taken in such circumstances. As shown, FIG. 10 includes a UE 1002, a Cell#1 1004, a Cell#2 1006, and a Cell#3 1008. Once again, initially, the Cell#1 1004 may send the first portion of configuration information (i.e., via an RRC reconfiguration message) to the UE 1002, as represented by arrow 1010. The first portion may include configuration information (e.g., SR configuration information, RACH configuration information, an initial BWP, and so forth) associated with each of the potential target cells (i.e., both Cell#2 1006 and Cell#3 1008). The UE 1002 may store the first portion of configuration information until it can be used, as represented by block 1022.

At some point (e.g., in response to a particular condition), the Cell#1 1004 may transmit a cell change indication associated with the target cell, Cell#2 1006, as represented by arrow 1012. As described elsewhere herein, the UE 1002 may apply the first portion of configuration information associated with the target cell, Cell#2 1006 and perform a cell change, as represented by block 1024.

Using the SR configuration information (or RACH configuration information) associated with Cell#2 1006 acquired in the first portion of configuration information, the UE 1002 and the Cell#2 1006 may perform an SR transmission procedure, as represented by arrow 1014. As shown, the UE 1002 does not receive the second portion of the RRC reconfiguration configuration information from the Cell#2 1006 (i.e., within a predetermined period of time).

At some point, the Cell#2 1006 may transmit a cell change indication associated with the new target cell, Cell#3 1008, as represented by arrow 1016. Using the RACH configuration information (or SR configuration information) associated with Cell#3 1008 acquired in the first portion of configuration information, the UE 1002 may perform a RACH transmission procedure, as represented by arrow 1018. In addition, as represented by block 1026, the UE 1002 may perform a cell change and apply the first portion of configuration information associated with Cell#3 1008. Finally, the Cell#3 1008 may then send the second portion of the RRC reconfiguration configuration information associated with Cell#3 1008, as represented by arrow 1020.

Accordingly, when a UE performs a cell change practicing the principles herein, but has not received the 2nd part of the current serving cell (e.g., Cell#2 1006 in the example of FIG. 10), the UE may execute the cell change to the next cell (e.g., Cell#3 1008 in the example of FIG. 10).

Figure 11:
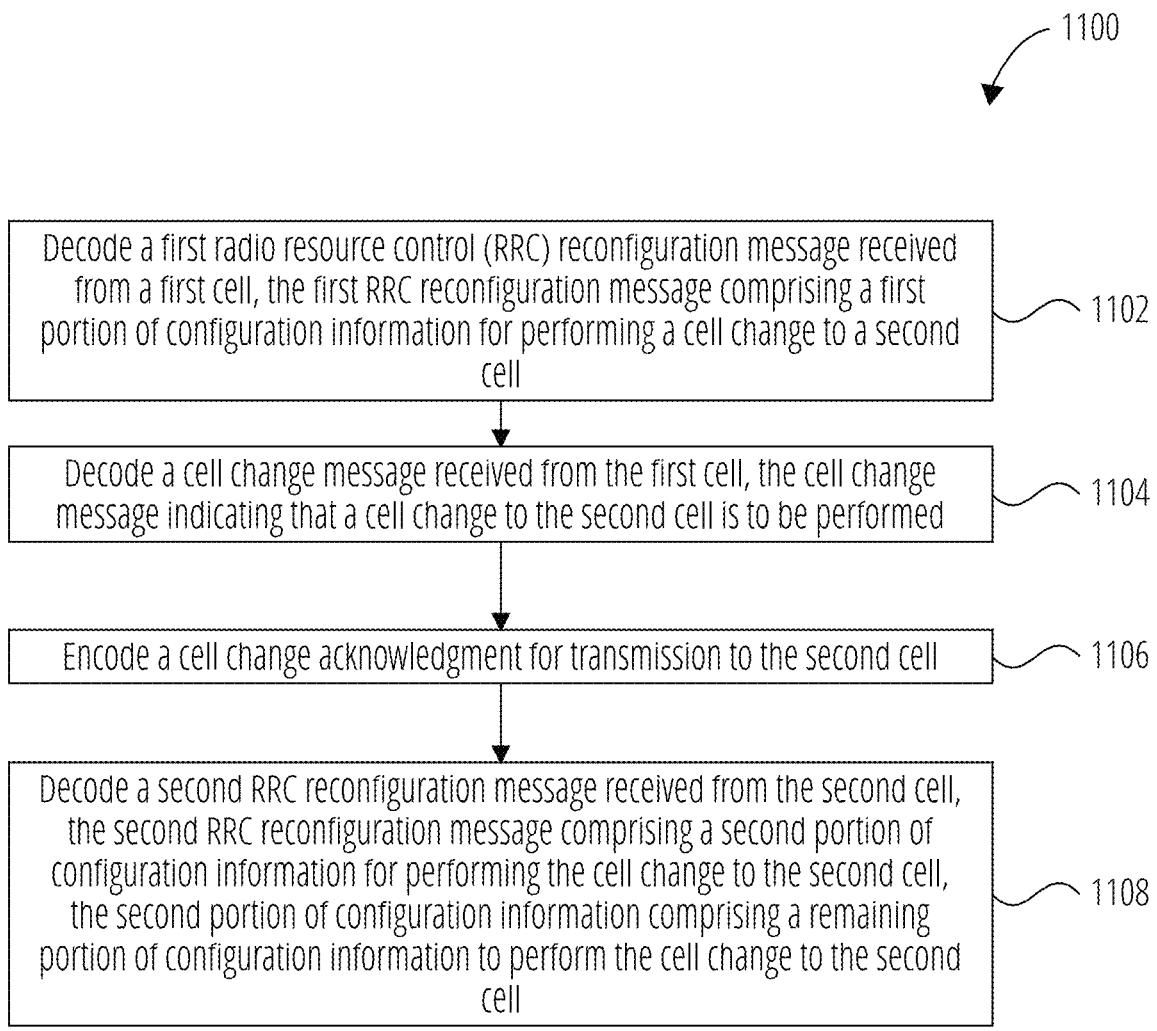
FIG. 11 illustrates a flowchart of a method for inter-cell mobility in accordance with one embodiment.

FIG. 11 illustrates a method 1100 for inter-cell mobility. In block 1102, the method 1100 decodes a first radio resource control (RRC) reconfiguration message received from a first cell. The first RRC reconfiguration message may comprise a first portion of configuration information for performing a cell change to a second cell. For instance, the first RRC reconfiguration message may be sent from a current serving/source cell of the UE and the first portion of configuration information may comprise a first portion of configuration information that the UE has to have to change cells to a target cell (i.e., the second cell).

In block 1104, the method 1100 decodes a cell change message from the first cell. The cell change message indicating that a cell change to the second cell is to be performed. In an example, the current source/serving cell (i.e., the first cell) of the UE may send an indication to the UE regarding changing to a target cell (i.e., the second cell). In block 1106, the method 1100 encodes a cell change acknowledgment for transmission to the second cell. For instance, the UE may send an initial access communication to the target cell for which a cell change has been previously indicated by the serving/source cell.

In block 1108, the method 1100 decodes a second RRC reconfiguration message received from the second cell. The second RRC reconfiguration message may comprise a second portion of configuration information for performing the cell change to the second cell. The second portion of configuration information may comprise a remaining portion of configuration information to perform the cell change to the second cell. For instance, the target cell may send all of the remaining portion(s) of configuration information in order for the UE to change cells to the target cell.

The method 1100 may also include the first portion of configuration information including at least one of a bandwidth part (BWP), system information block 1 (SIB1), or a master information block (MIB). The method 1100 may also include UE encoding the cell change acknowledgement for transmission to the second cell prior to receiving the second RRC reconfiguration message. The method 1100 may also include the second RRC reconfiguration message also including the first portion of configuration information of the first RRC reconfiguration message.

The method 1100 may also include the second portion of configuration information being limited to configuration information not included within the first portion of configuration information. The method 1100 may also include the second RRC reconfiguration message also including a third portion of configuration information for performing a new cell change to a third cell. The method 1100 may also include the UE storing the third portion of configuration information for a possible future cell change to the third cell.

The method 1100 may also include applying the second portion of configuration information immediately upon decoding the second RRC reconfiguration message. The method 1100 may also include the second portion of configuration information including at least one of a UE-dedicated configuration, a measurement configuration, carrier aggregation (CA) information, or dual connectivity (DC) information. The method 1100 may also include the cell change acknowledgement comprising a random access channel (RACH) procedure.

The method 1100 may also include a RACH configuration for performing the RACH procedure being included in the first portion of configuration information for performing a cell change to the second cell. The method 1100 may also include the UE acquiring a cell radio network temporary identifier (C-RNTI) through the RACH procedure. The method 1100 may also include the cell change acknowledgement comprising one of a scheduling request (SR), physical uplink control channel (PUCCH) transmission, or a physical uplink shared channel (PUSCH) transmission.

The method 1100 may also include the one of the SR, the PUCCH transmission, or the PUSCH transmission being included in the first portion of configuration information for performing a cell change to the second cell. The method 1100 may also include the UE acquiring a cell radio network temporary identifier (C-RNTI) within the first portion of configuration information. The method 1100 may also include the second RRC reconfiguration message comprising a first downlink (DL) transmission sent by the second cell to the UE prior to any other DL transmissions being sent by the second cell to the UE.

The method 1100 may also include the second RRC reconfiguration message being sent to the UE by the second cell within a predetermined time period. The method 1100 may also include the first portion of configuration information including at least one of a bandwidth part (BWP), system information block 1 (SIB1), or a master information block (MIB) and the second portion of configuration information including at least one of a UE-dedicated configuration, a measurement configuration, carrier aggregation (CA) information, or dual connectivity (DC) information.

Figure 12:
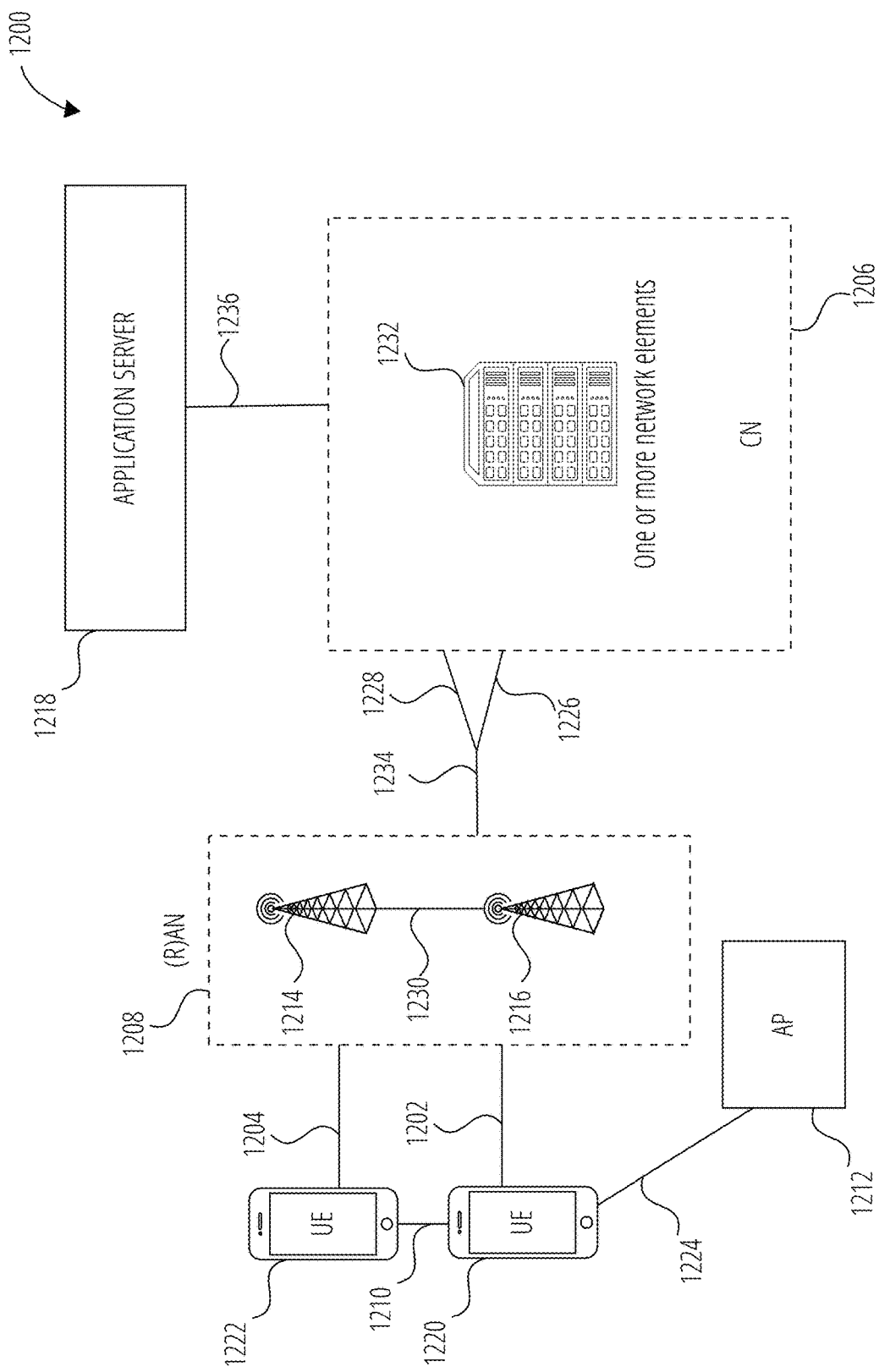
FIG. 12 illustrates a system in accordance with one embodiment.

FIG. 12 illustrates an example architecture of a system 1200 of a network, in accordance with various embodiments. The following description is provided for an example system 1200 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 12, the system 1200 includes UE 1222 and UE 1220. In this example, the UE 1222 and the UE 1220 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 1222 and/or the UE 1220 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 1222 and UE 1220 may be configured to connect, for example, communicatively couple, with an access node or radio access node (shown as (R)AN 1208). In embodiments, the (R)AN 1208 may be an NG RAN or a 5G RAN, an E-UTRAN, or a legacy RAN, such as a UTRAN or GERAN. As used herein, the term "NG RAN" or the like may refer to a (R)AN 1208 that operates in an NR or 5G system, and the term "E-UTRAN" or the like may refer to a (R)AN 1208 that operates in an LTE or 4G system. The UE 1222 and UE 1220 utilize connections (or channels) (shown as connection 1204 and connection 1202, respectively), each of which comprises a physical communications interface or layer (discussed in further detail below).

In this example, the connection 1204 and connection 1202 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UE 1222 and UE 1220 may directly exchange communication data via a ProSe interface 1210. The ProSe interface 1210 may alternatively be referred to as a sidelink (SL) interface 110 and may comprise one or more logical channels, including but not limited to a PSCCH, a PSSCH, a PSDCH, and a PSBCH.

The UE 1220 is shown to be configured to access an AP 1212 (also referred to as "WLAN node," "WLAN," "WLAN Termination," "WT" or the like) via connection 1224. The connection 1224 can comprise a local wireless connection, such as a connection consistent with any IEEE 802.11 protocol, wherein the AP 1212 would comprise a wireless fidelity (Wi-Fi®) router. In this example, the AP 1212 may be connected to the Internet without connecting to the core network of the wireless system (described in further detail below). In various embodiments, the UE 1220, (R)AN 1208, and AP 1212 may be configured to utilize LWA operation and/or LWIP operation. The LWA operation may involve the UE 1220 in RRC_CONNECTED being configured by the RAN node 1214 or the RAN node 1216 to utilize radio resources of LTE and WLAN. LWIP operation may involve the UE 1220 using WLAN radio resources (e.g., connection 1224) via IPsec protocol tunneling to authenticate and encrypt packets (e.g., IP packets) sent over the connection 1224. IPsec tunneling may include encapsulating the entirety of original IP packets and adding a new packet header, thereby protecting the original header of the IP packets.

The (R)AN 1208 can include one or more AN nodes, such as RAN node 1214 and RAN node 1216, that enable the connection 1204 and connection 1202. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or 5G system (for example, a gNB), and the term "E-UTRAN node" or the like may refer to a RAN node that operates in an LTE or 4G system 1200 (e.g., an eNB). According to various embodiments, the RAN node 1214 or RAN node 1216 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 1214 or RAN node 1216 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 1214 or RAN node 1216); a MAC/PHY split wherein RRC, PDCP, RLC, and MAC layers are operated by the CRAN/vBBUP and the PHY layer is operated by individual RAN nodes (e.g., RAN node 1214 or RAN node 1216); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 1214 or RAN node 1216 to perform other virtualized applications. In some implementations, an individual RAN node may represent individual gNB-DUs that are connected to a gNB-CU via individual F1 interfaces (not shown by FIG. 12). In these implementations, the gNB-DUs may include one or more remote radio heads or RFEMs, and the gNB-CU may be operated by a server that is located in the (R)AN 1208 (not shown) or by a server pool in a similar manner as the CRAN/vBBUP. Additionally, or alternatively, one or more of the RAN node 1214 or RAN node 1216 may be next generation eNBs (ng-eNBs), which are RAN nodes that provide E-UTRA user plane and control plane protocol terminations toward the UE 1222 and UE 1220, and are connected to an SGC via an NG interface (discussed infra). In V2X scenarios one or more of the RAN node 1214 or RAN node 1216 may be or act as RSUs.

The RAN node 1214 and/or the RAN node 1216 can terminate the air interface protocol and can be the first point of contact for the UE 1222 and UE 1220. In some embodiments, the RAN node 1214 and/or the RAN node 1216 can fulfill various logical functions for the (R)AN 1208 including, but not limited to, radio network controller (RNC) functions such as radio bearer management, uplink and downlink dynamic radio resource management and data packet scheduling, and mobility management.

In embodiments, the UE 1222 and UE 1220 can be configured to communicate using OFDM communication signals with each other or with the RAN node 1214 and/or the RAN node 1216 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 1214 and/or the RAN node 1216 to the UE 1222 and UE 1220, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 1222 and UE 1220 and the RAN node 1214 and/or the RAN node 1216 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 1222 and UE 1220 and the RAN node 1214 or RAN node 1216 may operate using LAA, eLAA, and/or feLAA mechanisms. In these implementations, the UE 1222 and UE 1220 and the RAN node 1214 or RAN node 1216 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 1222 and UE 1220, RAN node 1214 or RAN node 1216, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 1222, AP 1212, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The PDSCH carries user data and higher-layer signaling to the UE 1222 and UE 1220. The PDCCH carries information about the transport format and resource allocations related to the PDSCH channel, among other things. It may also inform the UE 1222 and UE 1220 about the transport format, resource allocation, and HARQ information related to the uplink shared channel. Typically, downlink scheduling (assigning control and shared channel resource blocks to the UE 1220 within a cell) may be performed at any of the RAN node 1214 or RAN node 1216 based on channel quality information fed back from any of the UE 1222 and UE 1220. The downlink resource assignment information may be sent on the PDCCH used for (e.g., assigned to) each of the UE 1222 and UE 1220.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 1214 or RAN node 1216 may be configured to communicate with one another via interface 1230. In embodiments where the system 1200 is an LTE system (e.g., when CN 1206 is an EPC), the interface 1230 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 1222 from an SeNB for user data; information of PDCP PDUs that were not delivered to a UE 1222; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 1200 is a 5G or NR system (e.g., when CN 1206 is an 5GC), the interface 1230 may be an Xn interface. The Xn interface is defined between two or more RAN nodes (e.g., two or more gNBs and the like) that connect to 5GC, between a RAN node 1214 (e.g., a gNB) connecting to 5GC and an eNB, and/or between two eNBs connecting to 5GC (e.g., CN 1206). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1222 in a connected mode (e.g., CM-CONNECTED) including functionality to manage the UE mobility for connected mode between one or more RAN node 1214 or RAN node 1216. The mobility support may include context transfer from an old (source) serving RAN node 1214 to new (target) serving RAN node 1216; and control of user plane tunnels between old (source) serving RAN node 1214 to new (target) serving RAN node 1216. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 1208 is shown to be communicatively coupled to a core network-in this embodiment, CN 1206. The CN 1206 may comprise one or more network elements 1232, which are configured to offer various data and telecommunications services to customers/subscribers (e.g., users of UE 1222 and UE 1220) who are connected to the CN 1206 via the (R)AN 1208. The components of the CN 1206 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 1206 may be referred to as a network slice, and a logical instantiation of a portion of the CN 1206 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 1218 may be an element offering applications that use IP bearer resources with the core network (e.g., UMTS PS domain, LTE PS data services, etc.). The application server 1218 can also be configured to support one or more communication services (e.g., VoIP sessions, PTT sessions, group communication sessions, social networking services, etc.) for the UE 1222 and UE 1220 via the EPC. The application server 1218 may communicate with the CN 1206 through an IP communications interface 1236.

In embodiments, the CN 1206 may be an 5GC, and the (R)AN 116 may be connected with the CN 1206 via an NG interface 1234. In embodiments, the NG interface 1234 may be split into two parts, an NG user plane (NG-U) interface 1226, which carries traffic data between the RAN node 1214 or RAN node 1216 and a UPF, and the S1 control plane (NG-C) interface 1228, which is a signaling interface between the RAN node 1214 or RAN node 1216 and AMFs.

In embodiments, the CN 1206 may be a 5G CN, while in other embodiments, the CN 1206 may be an EPC). Where CN 1206 is an EPC, the (R)AN 116 may be connected with the CN 1206 via an S1 interface 1234. In embodiments, the S1 interface 1234 may be split into two parts, an S1 user plane (S1-U) interface 1226, which carries traffic data between the RAN node 1214 or RAN node 1216 and the S-GW, and the S1-MME interface 1228, which is a signaling interface between the RAN node 1214 or RAN node 1216 and MMEs.

Figure 13:
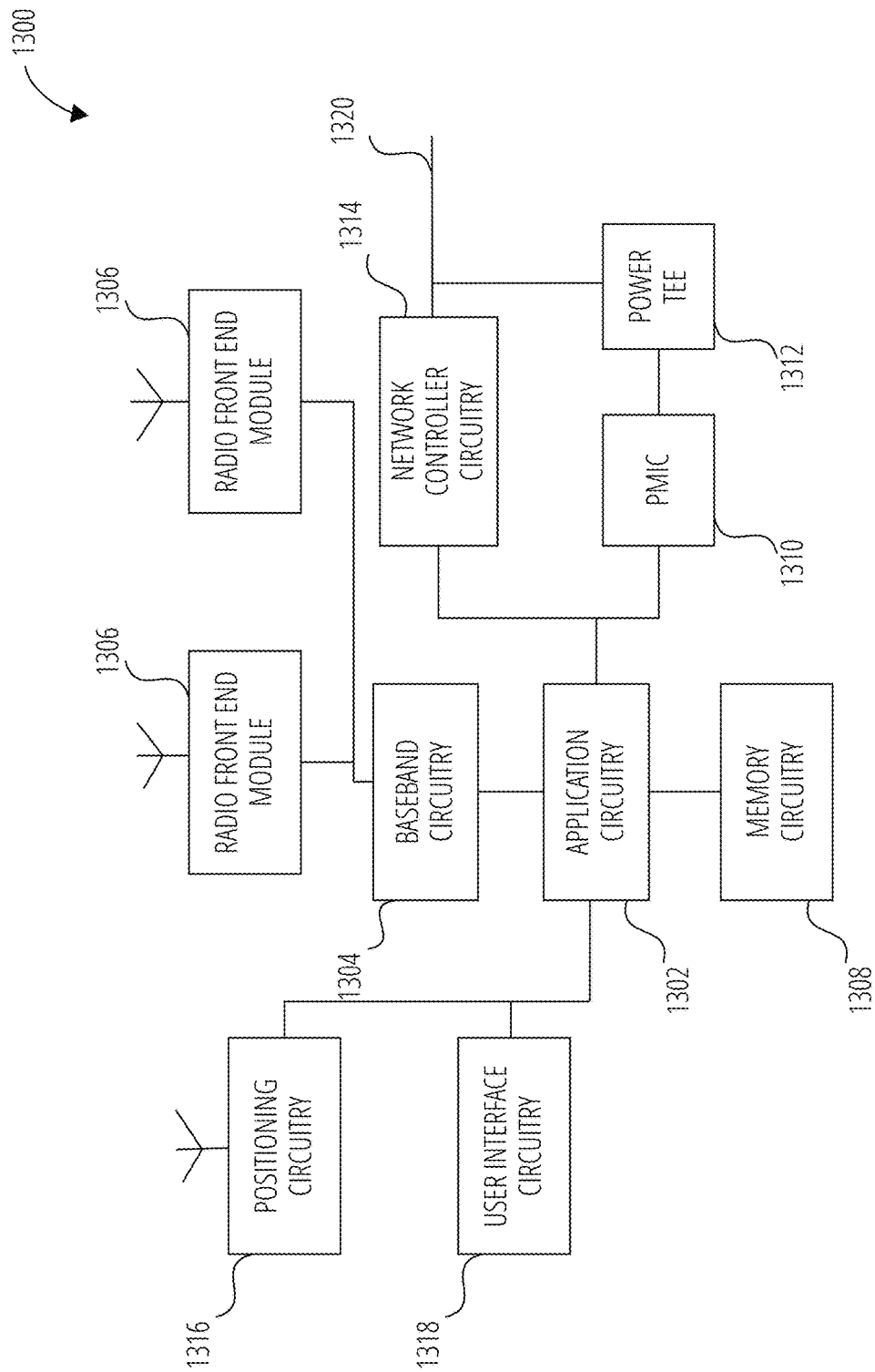
FIG. 13 illustrates an infrastructure equipment in accordance with one embodiment.

FIG. 13 illustrates an example of infrastructure equipment 1300 in accordance with various embodiments. The infrastructure equipment 1300 may be implemented as a base station, radio head, RAN node, AN, application server, and/or any other element/device discussed herein. In other examples, the infrastructure equipment 1300 could be implemented in or by a UE.

The infrastructure equipment 1300 includes application circuitry 1302, baseband circuitry 1304, one or more radio front end module 1306 (RFEM), memory circuitry 1308, power management integrated circuitry (shown as PMIC 1310), power tee circuitry 1312, network controller circuitry 1314, network interface connector 1320, satellite positioning circuitry 1316, and user interface circuitry 1318. In some embodiments, the device infrastructure equipment 1300 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 1302 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1302 may be coupled with or may include memory/storage elements and may be configured to execute instructions stored in the memory/storage to enable various applications or operating systems to run on the infrastructure equipment 1300. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1302 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1302 may comprise, or may be, a special-purpose processor/controller to operate according to the various embodiments herein. As examples, the processor(s) of application circuitry 1302 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium(™), Inc.; a MIPS-based design from MIPS Technologies, Inc. such as MIPS Warrior P-class processors; and/or the like. In some embodiments, the infrastructure equipment 1300 may not utilize application circuitry 1302, and instead may include a special-purpose processor/controller to process IP data received from an EPC or 5GC, for example.

In some implementations, the application circuitry 1302 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1302 may comprise logic blocks or logic fabric, and other interconnected resources that may be programmed to perform various functions, such as the procedures, methods, functions, etc. of the various embodiments discussed herein. In such embodiments, the circuitry of application circuitry 1302 may include memory cells (e.g., erasable programmable read-only memory (EPROM), electrically erasable programmable read-only memory (EEPROM), flash memory, static memory (e.g., static random access memory(SRAM), anti-fuses, etc.)) used to store logic blocks, logic fabric, data, etc. in look-up-tables (LUTs) and the like. The baseband circuitry 1304 may be implemented, for example, as a solder-down substrate including one or more integrated circuits, a single packaged integrated circuit soldered to a main circuit board or a multi-chip module containing two or more integrated circuits.

The user interface circuitry 1318 may include one or more user interfaces designed to enable user interaction with the infrastructure equipment 1300 or peripheral component interfaces designed to enable peripheral component interaction with the infrastructure equipment 1300. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 1306 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1306, which incorporates both mmWave antennas and sub-mmWave.

The memory circuitry 1308 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory(MRAM), etc., and may incorporate the three-dimensional (3D)cross-point (XPOINT) memories from Intel® and Micron®. The memory circuitry 1308 may be implemented as one or more of solder down packaged integrated circuits, socketed memory modules and plug-in memory cards.

The PMIC 1310 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1312 may provide for electrical power drawn from a network cable to provide both power supply and data connectivity to the infrastructure equipment 1300 using a single cable.

The network controller circuitry 1314 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1300 via network interface connector 1320 using a physical connection, which may be electrical (commonly referred to as a "copper interconnect"), optical, or wireless. The network controller circuitry 1314 may include one or more dedicated processors and/or FPGAs to communicate using one or more of the aforementioned protocols. In some implementations, the network controller circuitry 1314 may include multiple controllers to provide connectivity to other networks using the same or different protocols.

Figure 14:
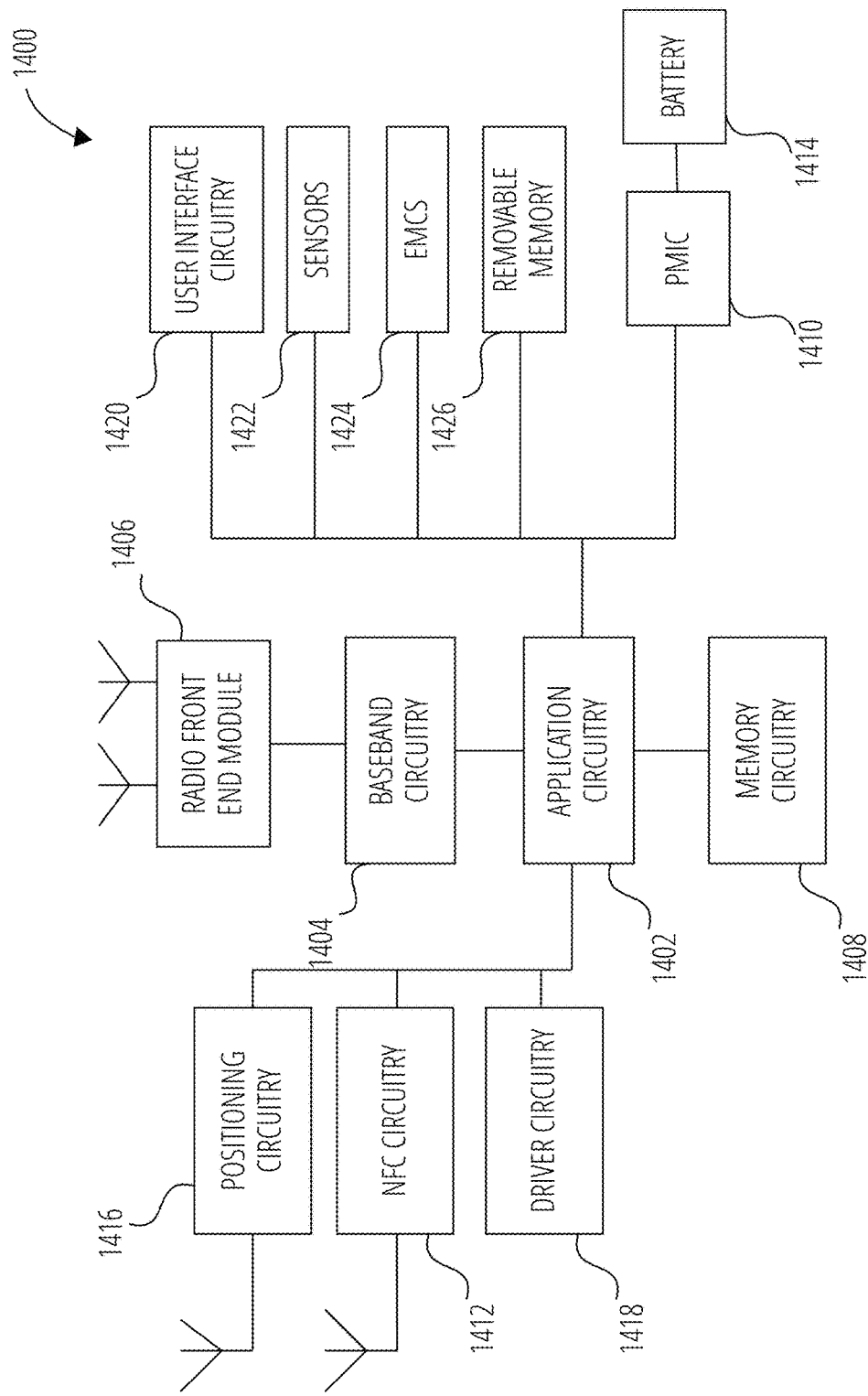
FIG. 14 illustrates a platform in accordance with one embodiment.

FIG. 14 illustrates an example of a platform 1400 in accordance with various embodiments. In embodiments, the computer platform 1400 may be suitable for use as UEs, application servers, and/or any other element/device discussed herein. The platform 1400 may include any combinations of the components shown in the example. The components of platform 1400 may be implemented as integrated circuits (ICs), portions thereof, discrete electronic devices, or other modules, logic, hardware, software, firmware, or a combination thereof adapted in the computer platform 1400, or as components otherwise incorporated within a chassis of a larger system. The block diagram of FIG. 14 is intended to show a high level view of components of the computer platform 1400. However, some of the components shown may be omitted, additional components may be present, and different arrangement of the components shown may occur in other implementations.

Application circuitry 1402 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose IO, memory card controllers such as SD MMC or similar, USB interfaces, MIPI interfaces, and JTAG test access ports. The processors (or cores) of the application circuitry 1402 may be coupled with or may include memory/storage elements and may be configured to execute instructions stored in the memory/storage to enable various applications or operating systems to run on the platform 1400. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1402 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1402 may comprise, or may be, a special-purpose processor/controller to operate according to the various embodiments herein.

As examples, the processor(s) of application circuitry 1402 may include an Intel® Architecture Core™ based processor, such as a Quark™, an Atom™, an i3, an i5, an i7, or an MCU-class processor, or another such processor available from Intel® Corporation. The processors of the application circuitry 1402 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1402 may be a part of a system on a chip (SoC) in which the application circuitry 1402 and other components are formed into a single integrated circuit, or a single package, such as the Edison™ or Galileo™ SoC boards from Intel® Corporation.

Additionally or alternatively, application circuitry 1402 may include circuitry such as, but not limited to, one or more a field-programmable devices (FPDs) such as FPGAs and the like; programmable logic devices(PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1402 may comprise logic blocks or logic fabric, and other interconnected resources that may be programmed to perform various functions, such as the procedures, methods, functions, etc. of the various embodiments discussed herein. In such embodiments, the circuitry of application circuitry 1402 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in look-up tables (LUTs) and the like.

The baseband circuitry 1404 may be implemented, for example, as a solder-down substrate including one or more integrated circuits, a single packaged integrated circuit soldered to a main circuit board or a multi-chip module containing two or more integrated circuits.

The radio front end module 1406 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1406, which incorporates both mmWave antennas and sub-mmWave.

The memory circuitry 1408 may include any number and type of memory devices used to provide for a given amount of system memory. As examples, the memory circuitry 1408 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 1408 may be developed in accordance with a Joint Electron Devices Engineering Council (JEDEC) low power double data rate (LPDDR)-based design, such as LPDDR2, LPDDR3, LPDDR4, or the like. Memory circuitry 1408 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1408 maybe on-die memory or registers associated with the application circuitry 1402. To provide for persistent storage of information such as data, applications, operating systems and so forth, memory circuitry 1408 may include one or more mass storage devices, which may include, inter alia, a solid state disk drive (SSDD), hard disk drive(HDD), a microHDD, resistance change memories, phase change memories, holographic memories, or chemical memories, among others. For example, the computer platform 1400 may incorporate the three-dimensional (3D) cross-point (XPOINT) memories from Intel® and Micron®.

The removable memory 1426 may include devices, circuitry, enclosures/housings, ports or receptacles, etc. used to couple portable data storage devices with the platform 1400. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1400 may also include interface circuitry (not shown) that is used to connect external devices with the platform 1400. The external devices connected to the platform 1400 via the interface circuitry include sensors 1422 and electro-mechanical components (shown as EMCs 1424), as well as removable memory devices coupled to removable memory 1426.

The sensors 1422 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1424 include devices, modules, or subsystems whose purpose is to enable platform 1400 to change its state, position, and/or orientation, or move or control a mechanism or (sub)system. Additionally, EMCs 1424 may be configured to generate and send messages/signaling to other components of the platform 1400 to indicate a current state of the EMCs 1424. Examples of the EMCs 1424 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1400 is configured to operate one or more EMCs 1424 based on one or more captured events and/or instructions or control signals received from a service provider and/or various clients. In some implementations, the interface circuitry may connect the platform 1400 with positioning circuitry 1416.

In some implementations, the interface circuitry may connect the platform 1400 with Near-Field Communication circuitry (shown as NFC circuitry 1412). The NFC circuitry 1412 is configured to provide contactless, short-range communications based on radio frequency identification (RFID) standards, wherein magnetic field induction is used to enable communication between NFC circuitry 1412 and NFC-enabled devices external to the platform 1400 (e.g., an "NFC touchpoint"). NFC circuitry 1412 comprises an NFC controller coupled with an antenna element and a processor coupled with the NFC controller. The NFC controller may be a chip/IC providing NFC functionalities to the NFC circuitry 1412 by executing NFC controller firmware and an NFC stack The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1412, or initiate data transfer between the NFC circuitry 1412 and another active NFC device (e.g., a smartphone or an NFC-enabled POS terminal) that is proximate to the platform 1400.

The driver circuitry 1418 may include software and hardware elements that operate to control particular devices that are embedded in the platform 1400, attached to the platform 1400, or otherwise communicatively coupled with the platform 1400. The driver circuitry 1418 may include individual drivers allowing other components of the platform 1400 to interact with or control various input/output (I/O) devices that may be present within, or connected to, the platform 1400. For example, driver circuitry 1418 may include a display driver to control and allow access to a display device, a touchscreen driver to control and allow access to a touchscreen interface of the platform 1400, sensor drivers to obtain sensor readings of sensors 1422 and control and allow access to sensors 1422, EMC drivers to obtain actuator positions of the EMCs 1424 and/or control and allow access to the EMCs 1424, a camera driver to control and allow access to an embedded image capture device, audio drivers to control and allow access to one or more audio devices.

The power management integrated circuitry (shown as PMIC 1410) (also referred to as "power management circuitry") may manage power provided to various components of the platform 1400. In particular, with respect to the baseband circuitry 1404, the PMIC 1410 may control power-source selection, voltage scaling, battery charging, or DC-to-DC conversion. The PMIC 1410 may often be included when the platform 1400 is capable of being powered by a battery 1414, for example, when the device is included in a UE.

In some embodiments, the PMIC 1410 may control, or otherwise be part of, various power saving mechanisms of the platform 1400. For example, if the platform 1400 is in an RRC_Connected state, where it is still connected to the RAN node as it expects to receive traffic shortly, then it may enter a state known as Discontinuous Reception Mode (DRX) after a period of inactivity. During this state, the platform 1400 may power down for brief intervals of time and thus save power. If there is no data traffic activity for an extended period of time, then the platform 1400 may transition off to an RRC_Idle state, where it disconnects from the network and does not perform operations such as channel quality feedback, handover, etc. The platform 1400 goes into a very low power state and it performs paging where again it periodically wakes up to listen to the network and then powers down again. The platform 1400 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1414 may power the platform 1400, although in some examples the platform 1400 may be mounted deployed in a fixed location, and may have a power supply coupled to an electrical grid. The battery 1414 may be a lithium ion battery, a metal-air battery, such as a zinc-air battery, an aluminum-air battery, a lithium-air battery, and the like. In some implementations, such as in V2X applications, the battery 1414 may be a typical lead-acid automotive battery.

In some implementations, the battery 1414 may be a "smart battery," which includes or is coupled with a Battery Management System (BMS) or battery monitoring integrated circuitry. The BMS may be included in the platform 1400 to track the state of charge (SoCh) of the battery 1414. The BMS may be used to monitor other parameters of the battery 1414 to provide failure predictions, such as the state of health (SoH) and the state of function (SoF) of the battery 1414. The BMS may communicate the information of the battery 1414 to the application circuitry 1402 or other components of the platform 1400. The BMS may also include an analog-to-digital (ADC) convertor that allows the application circuitry 1402 to directly monitor the voltage of the battery 1414 or the current flow from the battery 1414. The battery parameters may be used to determine actions that the platform 1400 may perform, such as transmission frequency, network operation, sensing frequency, and the like.

A power block, or other power supply coupled to an electrical grid may be coupled with the BMS to charge the battery 1414. In some examples, the power block may be replaced with a wireless power receiver to obtain the power wirelessly, for example, through a loop antenna in the computer platform 1400. In these examples, a wireless battery charging circuit may be included in the BMS. The specific charging circuits chosen may depend on the size of the battery 1414, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1420 includes various input/output (I/O) devices present within, or connected to, the platform 1400, and includes one or more user interfaces designed to enable user interaction with the platform 1400 and/or peripheral component interfaces designed to enable peripheral component interaction with the platform 1400. The user interface circuitry 1420 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/ or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1400. The output device circuitry may also include speakers or other audio emitting devices, printer(s), and/or the like. In some embodiments, the sensors 1422 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1400 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an I$^2$C interface, an SPI interface, point-to-point interfaces, and a power bus, among others.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1A may include a system for inter-cell mobility at a network, comprising: a first cell including: one or more processors; and one or more hardware storage devices having stored thereon computer-executable instructions that are executable by the one or more processors to cause the first cell to perform the following: encode a first radio resource control (RRC) reconfiguration message for transmission to a user equipment (UE), the first RRC reconfiguration message comprising a first portion of configuration information for configuring the UE to perform a cell change to a second cell; and encode a cell change message for transmission to the UE, the cell change message indicating that a cell change to the second cell is to be performed; and a second cell including: one or more processors; and one or more hardware storage devices having stored thereon computer-executable instructions that are executable by the one or more processors to cause the second cell to perform the following: decode a cell change acknowledgment received from the UE; and encode a second RRC reconfiguration message for transmission to the UE, the second RRC reconfiguration message comprising a second portion of configuration information for configuring the UE to perform the cell change to the second cell, the second portion of configuration information comprising a remaining portion of configuration information to configure the UE to perform the cell change to the second cell.

Example 2A may include the system of example 1A, wherein the second RRC reconfiguration message comprises a first downlink (DL) transmission sent by the second cell to the UE prior to any other DL transmissions being sent by the second cell to the UE.

Example 3A may include the system of example 1A, wherein the second RRC reconfiguration message is to be sent to the UE by the second cell within a predetermined time period.

Example 4A may include the system of example 1A, wherein the first portion of configuration information includes at least one of a bandwidth part (BWP), system information block 1 (SIB1), or a master information block (MIB) and the second portion of configuration information includes at least one of a UE-dedicated configuration, a measurement configuration, carrier aggregation (CA) information, or dual connectivity (DC) information.

Example 1B may include an apparatus comprising means to perform one or more elements of a method described in or related to any of the above Examples, or any other method or process described herein.

Example 2B may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 3B may include an apparatus comprising logic, modules, or circuitry to perform one or more elements of a method described in or related to any of the above Examples, or any other method or process described herein.

Example 4B may include a method, technique, or process as described in or related to any of the above Examples, or portions or parts thereof.

Example 5B may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 6B may include a signal as described in or related to any of the above Examples, or portions or parts thereof.

Example 7B may include a datagram, packet, frame, segment, protocol data unit (PDU), or message as described in or related to any of the above Examples, or portions or parts thereof, or otherwise described in the present disclosure.

Example 8B may include a signal encoded with data as described in or related to any of the above Examples, or portions or parts thereof, or otherwise described in the present disclosure.

Example 9B may include a signal encoded with a datagram, packet, frame, segment, PDU, or message as described in or related to any of the above Examples, or portions or parts thereof, or otherwise described in the present disclosure.

Example 10B may include an electromagnetic signal carrying computer-readable instructions, wherein execution of the computer-readable instructions by one or more processors is to cause the one or more processors to perform the method, techniques, or process as described in or related to any of the above Examples, or portions thereof Example 11B may include a computer program comprising instructions, wherein execution of the program by a processing element is to cause the processing element to carry out the method, techniques, or process as described in or related to any of the above Examples, or portions thereof.

Example 12B may include a signal in a wireless network as shown and described herein.

Example 13B may include a method of communicating in a wireless network as shown and described herein.

Example 14B may include a system for providing wireless communication as shown and described herein.

Example 15B may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for inter-cell mobility at a user equipment (UE), comprising:
   decoding a first radio resource control (RRC) reconfiguration message received from a first cell, the first RRC reconfiguration message comprising a first portion of configuration information for performing a cell change to a second cell;
   decoding a cell change message received from the first cell, the cell change message indicating that a cell change to the second cell is to be performed;
   encoding a cell change acknowledgment for transmission to the second cell; and
   decoding a second RRC reconfiguration message received from the second cell, the second RRC reconfiguration message comprising a second portion of configuration information for performing the cell change to the second cell, the second portion of configuration information comprising a remaining portion of configuration information to perform the cell change to the second cell.

2. The method of claim 1, wherein the first portion of configuration information includes at least one of a bandwidth part (BWP), system information block 1 (SIB1), or a master information block (MIB).

3. The method of claim 1, wherein the UE encodes the cell change acknowledgement for transmission to the second cell prior to receiving the second RRC reconfiguration message.

4. The method of claim 1, wherein the second RRC reconfiguration message also includes the first portion of configuration information of the first RRC reconfiguration message.

5. The method of claim 1, wherein the second portion of configuration information is limited to configuration information not included within the first portion of configuration information.

6. The method of claim 1, wherein the second RRC reconfiguration message also includes a third portion of configuration information for performing a new cell change to a third cell.

7. The method of claim 6, wherein the UE stores the third portion of configuration information for a possible future cell change to the third cell.

8. The method of claim 1, further comprising applying the second portion of configuration information immediately upon decoding the second RRC reconfiguration message.

9. The method of claim 1, wherein the second portion of configuration information includes at least one of a UE-dedicated configuration, a measurement configuration, carrier aggregation (CA) information, or dual connectivity (DC) information.

10. An apparatus for use in a user equipment (UE), comprising:
    one or more processors; and
    one or more hardware storage devices having stored thereon computer-executable instructions that are executable by the one or more processors to cause the apparatus to perform the following:
    decode a first radio resource control (RRC) reconfiguration message received from a first cell, the first RRC reconfiguration message comprising a first portion of configuration information for performing a cell change to a second cell;
    decode a cell change message received from the first cell, the cell change message indicating that a cell change to the second cell is to be performed;
    encode a cell change acknowledgment for transmission to the second cell; and
    decode a second RRC reconfiguration message received from the second cell, the second RRC reconfiguration message comprising a second portion of configuration information for performing the cell change to the second cell, the second portion of configuration information comprising a remaining portion of configuration information to perform the cell change to the second cell.

11. The apparatus of claim 10, wherein the cell change acknowledgement comprises a random access channel (RACH) procedure.

12. The apparatus of claim 11, wherein a RACH configuration for performing the RACH procedure is included in the first portion of configuration information for performing a cell change to the second cell.

13. The apparatus of claim 11, wherein the UE acquires a cell radio network temporary identifier (C-RNTI) through the RACH procedure.

14. The apparatus of claim 10, wherein the cell change acknowledgement comprises one of a scheduling request (SR), physical uplink control channel (PUCCH) transmission, or a physical uplink shared channel (PUSCH) transmission.

15. The apparatus of claim 14, wherein the one of the SR, the PUCCH transmission, or the PUSCH transmission is included in the first portion of configuration information for performing a cell change to the second cell.

16. The apparatus of claim 15, wherein the UE acquires a cell radio network temporary identifier (C-RNTI) within the first portion of configuration information.

17. A system for inter-cell mobility at a network, comprising:
    a first cell including:
       one or more processors; and
       one or more hardware storage devices having stored thereon computer-executable instructions that are executable by the one or more processors to cause the first cell to perform the following:
          encode a first radio resource control (RRC) reconfiguration message for transmission to a user equipment (UE), the first RRC reconfiguration message comprising a first portion of configuration information for configuring the UE to perform a cell change to a second cell; and
          encode a cell change message for transmission to the UE, the cell change message indicating that a cell change to the second cell is to be performed; and
    the second cell including:
       one or more processors; and
       one or more hardware storage devices having stored thereon computer-executable instructions that are executable by the one or more processors to cause the second cell to perform the following:
          decode a cell change acknowledgment received from the UE; and
          encode a second RRC reconfiguration message for transmission to the UE in response to decoding the cell change acknowledgement from the UE, the second RRC reconfiguration message comprising a second portion of configuration information for configuring the UE to perform the cell change to the second cell, the second portion of configuration information comprising a remaining portion of configuration information to configure the UE to perform the cell change to the second cell.

18. The system of claim 17, wherein the second RRC reconfiguration message comprises a first downlink (DL) transmission sent by the second cell to the UE prior to any other DL transmissions being sent by the second cell to the UE.

19. The system of claim 17, wherein the second RRC reconfiguration message is to be sent to the UE by the second cell within a predetermined time period.

20. The system of claim 17, wherein the first portion of configuration information includes at least one of a bandwidth part (BWP), system information block 1 (SIB1), or a master information block (MIB) and the second portion of configuration information includes at least one of a UE-dedicated configuration, a measurement configuration, carrier aggregation (CA) information, or dual connectivity (DC) information.

* * * * *